United States Patent
Daga et al.

(10) Patent No.: US 10,936,619 B2
(45) Date of Patent: Mar. 2, 2021

(54) MIXED DATA GRANULARITIES FOR MULTI-DIMENSIONAL DATA

(71) Applicant: Oracle International Corporation, Redwood Shores, CA (US)

(72) Inventors: Manish Daga, Karnataka (IN); Shivaranjan Gurunanjappa, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 252 days.

(21) Appl. No.: 15/924,726

(22) Filed: Mar. 19, 2018

(65) Prior Publication Data
US 2019/0102422 A1    Apr. 4, 2019

(30) Foreign Application Priority Data
Sep. 29, 2017    (IN) .............................. 201741034665

(51) Int. Cl.
| | |
|---|---|
| *G06F 16/25* | (2019.01) |
| *G06Q 10/04* | (2012.01) |
| *G06F 17/15* | (2006.01) |
| *G06F 16/28* | (2019.01) |
| *G06F 16/23* | (2019.01) |
| *G06F 3/0484* | (2013.01) |

(52) U.S. Cl.
CPC ........ *G06F 16/258* (2019.01); *G06F 16/2365* (2019.01); *G06F 16/282* (2019.01); *G06F 16/283* (2019.01); *G06F 17/153* (2013.01); *G06Q 10/04* (2013.01); *G06F 3/04847* (2013.01)

(58) Field of Classification Search
CPC .. G06F 16/258; G06F 16/282; G06F 16/2356; G06F 16/283; G06F 17/153
USPC ........................................................ 707/690
See application file for complete search history.

(56) References Cited

U.S. PATENT DOCUMENTS

| | | |
|---|---|---|
| 7,092,929 B1 | 8/2006 | Dvorak et al. |
| 7,480,623 B1 | 1/2009 | Landvater |
| (Continued) | | |

OTHER PUBLICATIONS

"Forecasting", SAP Help Portal, SAP ERP (/viewer/product/SAP_ERP/6.18.06/en-US), SAP for Professional Services, downloaded Oct. 16, 2017.

(Continued)

*Primary Examiner* — Syed H Hasan
*Assistant Examiner* — Nicholas E Allen
(74) *Attorney, Agent, or Firm* — Potomac Law Group, PLLC

(57) ABSTRACT

Embodiments can receive data granularities for data elements, wherein a weekly granularity is received for a first data element and a monthly granularity is received for a second data element. A selection of a cross-section of data can be received spanning a plurality of dimensions in the multi-dimensional data model, the selection including a first data combination based on the first data element and a second data combination based on the second data element. The weekly data of the first data element can be mapped to monthly data according to a predetermined conversion calculation. In a form, monthly data can be displayed for the second data combination based on the second data element and monthly data for the first data combination based on the mapped monthly data.

20 Claims, 13 Drawing Sheets

(56) References Cited

U.S. PATENT DOCUMENTS

| | | | |
|---|---|---|---|
| 7,644,009 B2 | 1/2010 | Amerasinghe et al. | |
| 8,364,676 B2 | 1/2013 | Handy et al. | |
| 2008/0172287 A1 | 7/2008 | Tien et al. | |
| 2010/0205024 A1* | 8/2010 | Shachar | G06Q 30/02 705/7.33 |
| 2010/0287146 A1* | 11/2010 | Skelton | G06Q 10/06 707/705 |
| 2012/0197686 A1* | 8/2012 | Abu El Ata | G06Q 10/06 705/7.39 |
| 2015/0058077 A1* | 2/2015 | Buban | G06Q 30/0202 705/7.31 |
| 2015/0213109 A1* | 7/2015 | Kassko | G06F 16/283 707/603 |
| 2015/0379449 A1 | 12/2015 | Gopinath et al. | |
| 2016/0019482 A1* | 1/2016 | Venhoff | G06Q 10/0639 705/7.38 |
| 2016/0092810 A1* | 3/2016 | Chatterjee | G06Q 10/0637 705/7.36 |
| 2016/0127539 A1* | 5/2016 | Sharma | H04L 45/22 379/112.09 |
| 2016/0171540 A1* | 6/2016 | Mangipudi | G06Q 30/0255 705/14.53 |
| 2017/0140319 A1* | 5/2017 | Gottemukkala | G06F 3/0482 |
| 2017/0140402 A1 | 5/2017 | Doi | |
| 2017/0169092 A1* | 6/2017 | Baird | G06F 16/2365 |
| 2017/0235657 A1* | 8/2017 | Goettge | G06F 16/2465 707/740 |

OTHER PUBLICATIONS

Arthur Unknown, SAP Help Portal, "Enhanced Forecasting Objects", Version 6.0 EHP8 SP06, Retrieved from: https://help.sap.com/viewer/1db360e2b9af40c488cc47df487a2ca3/6.18.06/en-US/a3c75749af48480d91c22050382c2bbc.html on Mar. 19, 2018.

Stefan De Kok, "Should You Forecast Monthly or Weekly?", Published on Nov. 9, 2016, Retrieved from: https://www.linkedin.com/pulse/should-you-forecast-monthly-weekly-stefan-de-kok on Mar. 19, 2018.

* cited by examiner

MIXED DATA GRANULARITIES FOR MULTI-DIMENSIONAL DATA

FIELD

The embodiments of the present disclosure generally relate to managing data with mixed granularities in a multi-dimensional data model.

BACKGROUND

Data planning, analytics, and processing for entities and/or scenarios can be performed over various intervals or granularities, such as daily, weekly, monthly, quarterly, yearly, and the like. Different circumstances may call for different granularities, such as manufacturing expenses being planned weekly while profit and loss are planned monthly. Further, complex multi-dimensional data models can include an unquantifiable number of potential intersections of data. For example, forecasting scenarios that enable powerful modeling for decision makers can include endless potential cross-sections of data. When related data concepts are tracked, planned, or forecasted using different granularities, managing data interactions in a multi-dimensional data model is especially challenging.

SUMMARY

The embodiments of the present disclosure are generally directed to systems and methods for to managing data with mixed granularities in a multi-dimensional data model that substantially improve upon the related art. Embodiments can receive data granularities for data elements, wherein a weekly granularity is received for a first data element and a monthly granularity is received for a second data element. A selection of a cross-section of data can be received spanning a plurality of dimensions in the multi-dimensional data model, the selection including a first data combination based on the first data element and a second data combination based on the second data element. The weekly data of the first data element can be mapped to monthly data according to a predetermined conversion calculation. In a form, monthly data can be displayed for the second data combination based on the second data element and monthly data for the first data combination based on the mapped monthly data.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Embodiments manage data elements of mixed granularity in a multidimensional data model. For example, a first data element can have a weekly granularity while a second data element has a monthly, quarterly, or yearly granularity. Selections can be received for cross-sections of data that involve, for example, the display of various combinations of data elements. In some embodiments, the data model can include a plurality of dimensions of data, such as entity, accounts, products, scenario, year, period, and the like. An example selected cross-section of data can include a combination of a given scenario, entity, and account. However, some cases will include mismatched data granularities that will cause an invalid data combination when retrieving the selected cross-section of data from the data model (e.g., database). Embodiments provide techniques for managing the mixed granularities. This management can include generating a plurality of rules for valid data combinations that can be used to filter the data retrieval. In some embodiments, conversion calculations are implemented so that data of varying granularities can still be displayed together. Some embodiments include a hierarchical multi-dimensional data model, where the plurality of rules for valid data combinations can include specific rules about parent nodes and child nodes. Thus, the valid combination rules can be used to manage mixed granularities among combinations of hierarchical data elements.

Embodiments of the conversion calculations include attributing weeks to months for a given quarter or year. For example, in some circumstances it may be appropriate to attribute a week to the month in which the first day of the week falls. In other circumstances, it may be appropriate to attribute a week to the month in which the majority of days in the week fall. Embodiments also describe reverse mapping techniques, that is mapping months to weeks, in order to perform relevant data analytics. Such mapping can be described as conversion calculations between granularities from among weekly, monthly, quarterly, or yearly periods.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
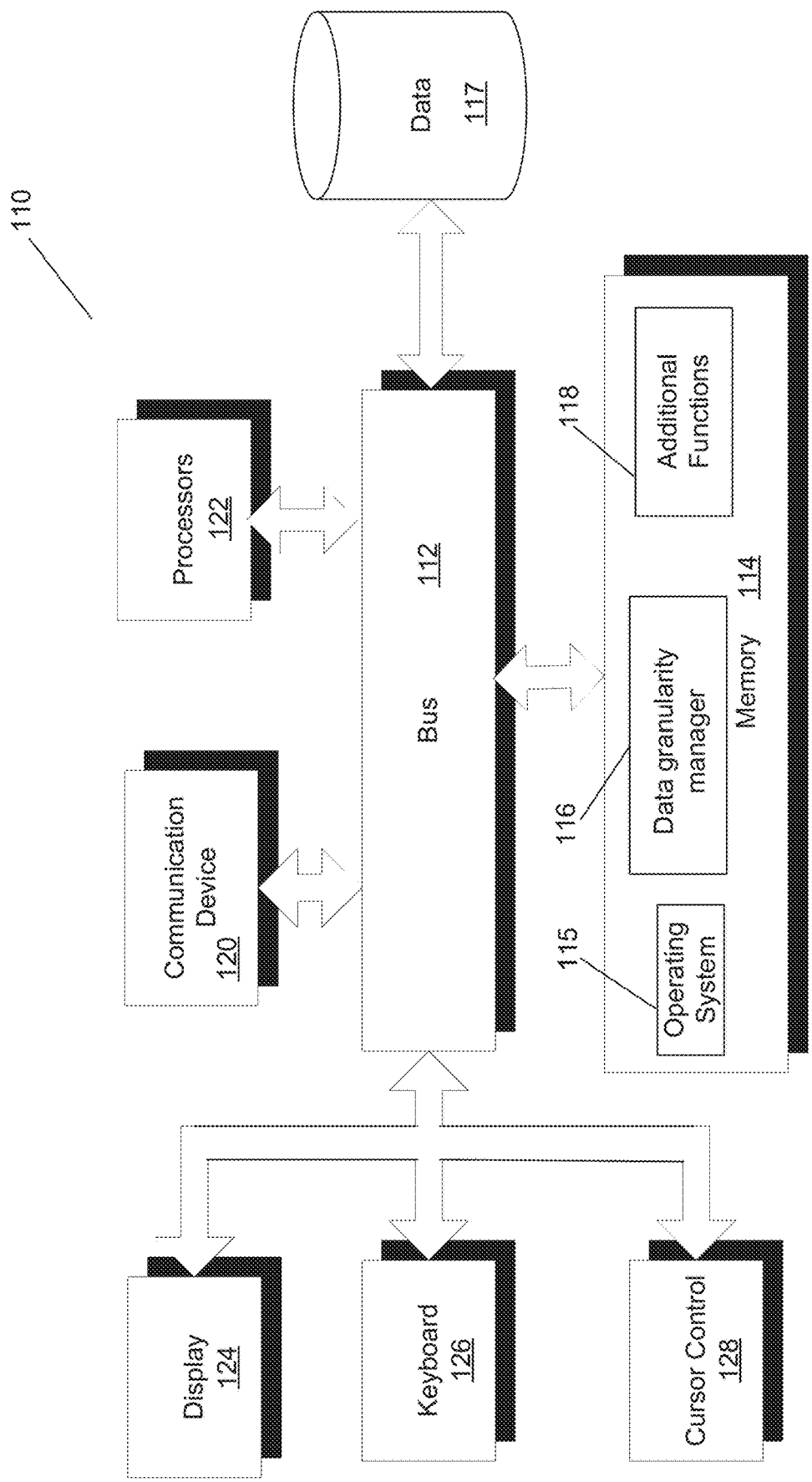
FIG. 1 illustrates a block diagram of a computing device operatively coupled to a mixed granularity data management system according to an example embodiment.

FIG. 1 is a block diagram of a computer server/system 110 in accordance with embodiments. As shown in FIG. 1, system 110 may include a bus device 112 and/or other communication mechanism(s) configured to communicate information between the various components of system 110, such as processor 122 and memory 114. In addition, communication device 120 may enable connectivity between processor 122 and other devices by encoding data to be sent from processor 122 to another device over a network (not shown) and decoding data received from another system over the network for processor 122.

For example, communication device 120 may include a network interface card that is configured to provide wireless network communications. A variety of wireless communication techniques may be used including infrared, radio, Bluetooth®, Wi-Fi, and/or cellular communications. Alternatively, communication device 120 may be configured to provide wired network connection(s), such as an Ethernet connection.

Processor 122 may include one or more general or specific purpose processors to perform computation and control functions of system 110. Processor 122 may include a single integrated circuit, such as a micro-processing device, or may include multiple integrated circuit devices and/or circuit boards working in cooperation to accomplish the functions of processor 122. In addition, processor 222 may execute computer programs, such as operating system 115, data granularity manager 116, and other applications 118, stored within memory 114.

System 110 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for system 110. The modules can include an operating system 115, data granularity manager 116, as well as other applications modules 118. Operating system 115 provides operating system functionality for system 110. Data granularity manager 116 may include one or more APIs that enables system calls for managing data granularity, or may further provide any other functionality of this disclosure. In some instances, data granularity manager 116 may be implemented as an in-memory configuration.

Non-transitory memory 114 may include a variety of computer-readable medium that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 122 is further coupled via bus 112 to a display 124, such as a Liquid Crystal Display ("LCD"). A keyboard 126 and a cursor control device 128, such as a computer mouse, are further coupled to communication device 112 to enable a user to interface with system 110.

In some embodiments, system 110 can be part of a larger system. Therefore, system 110 can include one or more additional functional modules 118 to include the additional functionality. Other applications modules 118 may include the various modules of the engagement engine ("EE") embedded in Oracle® Cloud or modules of Oracle® Enterprise Planning and Budgeting Cloud Service ("EPBCS"), for example. A database 117 is coupled to bus 112 to provide centralized storage for modules 116 and 118 and to store, for example, a multi-dimensional data model. Database 117 can store data in an integrated collection of logically-related records or files. Database 117 can be an operational database, an analytical database, a data warehouse, a distributed database, an end-user database, an external database, a navigational database, an in-memory database, a document-oriented database, a real-time database, a relational database, an object-oriented database, Hadoop File System ("HFDS"), or any other database known in the art.

Although shown as a single system, the functionality of system 110 may be implemented as a distributed system. For example, memory 114 and processor 122 may be distributed across multiple different computers that collectively represent system 110. In one embodiment, system 110 may be part of a device (e.g., smartphone, tablet, computer, etc.), and system 110 may provide software functionality.

In some embodiments, one or more devices may be in communication with system 100 and the system may function as a web server. Further, one or more components of system 100 may not be depicted in FIG. 1.

Figure 2:
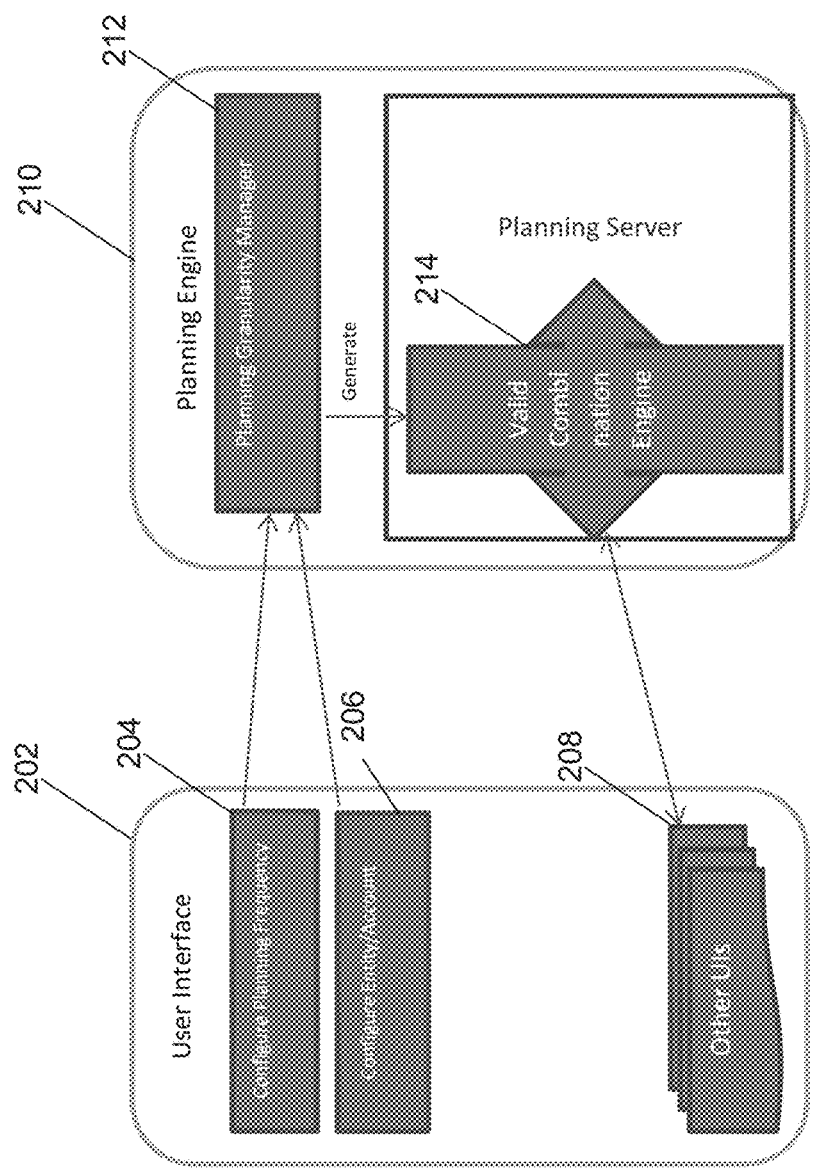
FIG. 2 illustrates a system for managing mixed data granularities for a multi-dimensional data model according to an example embodiment.

FIG. 2 illustrates a system for managing mixed data granularities for a multi-dimensional data model according to an example embodiment. User Interface 202 illustrates user interface elements that can be used to configure a granularity of data elements. For example, user interface 204 can be used to configure granularities for members of the dimension "Scenario" and user interface 206 can be used to configure granularities members of the dimensions "Entity" and/or "Account'. FIGS. 4-7 illustrate additional embodiments of graphical user interfaces for configuring the granularity of data elements in the multi-dimensional data model.

Figure 11:
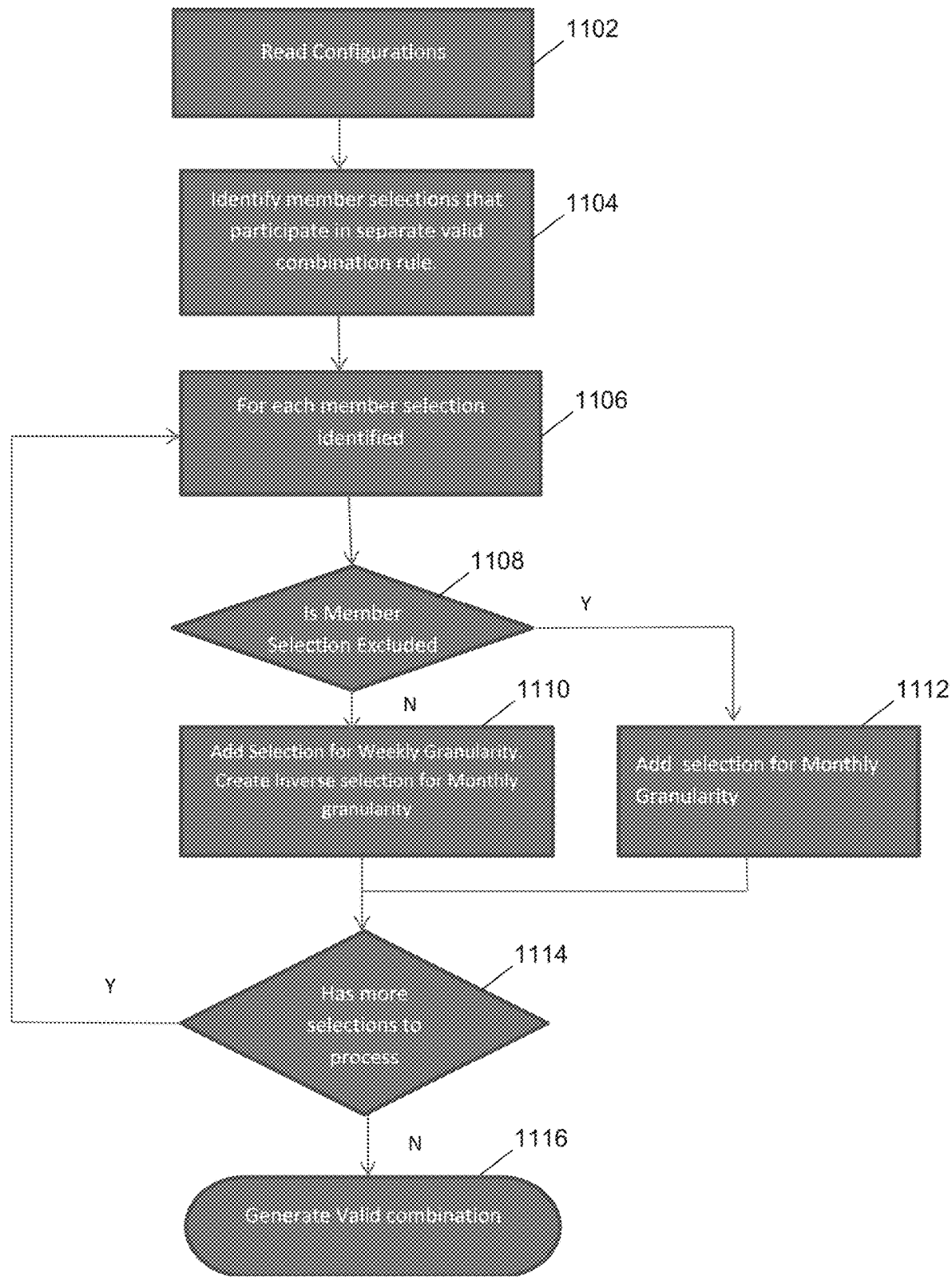
FIG. 11 illustrates an example flow diagram for determining invalid data combinations according to an example embodiment.

In some embodiments, planning engine 210 performs data processing for the multi-dimensional data model. For example, planning engine 210 can perform a number of functions, such as calculating, formatting, processing, and configuring views of cross-sections of the data elements of the data model. Planning engine 210 can also include valid combination engine 214. Valid combination engine 214 can generate a plurality of rules for evaluating the validity of various combinations of data elements and/or combinations of dimensions of data across the data model. For example, data elements with mixed granularity may not be valid. FIG. 11 illustrates a flow diagram for generating rules for evaluating valid combinations according to an embodiment.

Figure 3:
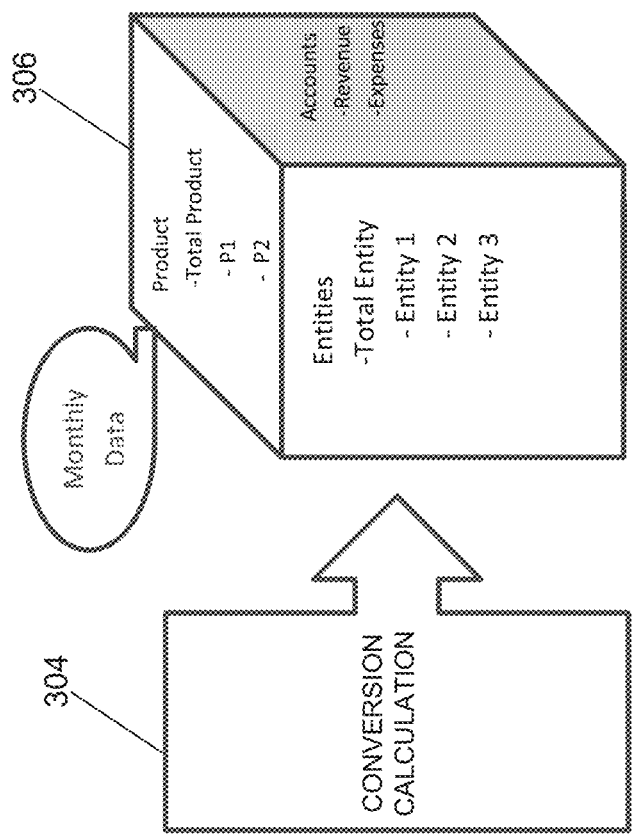
FIG. 3 illustrates a mapping between data cubes for managing different data granularities according to another example embodiment.
Figure 3:
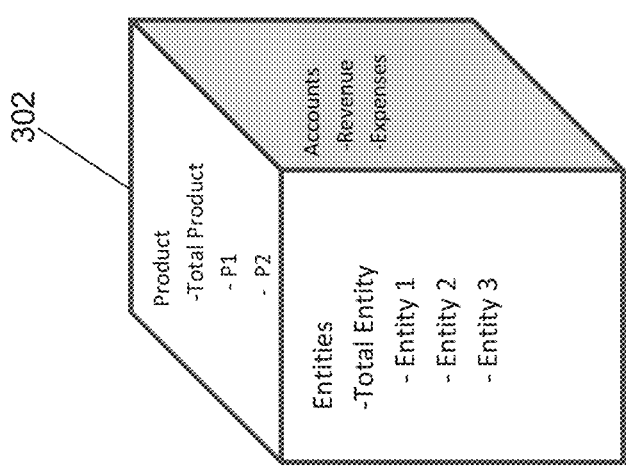

FIG. 3 illustrates a mapping between data cubes for managing different data granularities according to another example embodiment. For example, mixed granularities (e.g., weekly, monthly, quarterly, and the like) can be mapped back and forth to achieve functionality, such as display of a cross-section of the data model in a particular form or configuration. Conversion calculations disclosed herein can allow data elements of different granularities to be displayed together.

In some embodiments, cube 302 represents a multi-dimensional data model where each side of the cube represents different dimensions of data (e.g., Entity, Product, Account, Scenario, Year, Period, and the like). An example Entity dimension can include entity members of an organization, such as a country (e.g., US), which in turn can include child members country sales (e.g., US Sales), country manufacturing (e.g., US Manufacturing), and the like. An example Accounts dimension can include accounts members of an organization, such as Revenue, Profit, Expenses, and the like, where each can further include child account members. An example Year dimension can include members that are fiscal years, such as 2015, 2016, 2017, 2018, 2019, 2020, and the like. An example Scenario dimension can include members that represent various scenarios for an organization, such as a planning scenario, a forecasting scenario, a business use case scenario (e.g., such as planning a business change, like an acquisition), and the like. An example Currency dimension can include members that represent various world currencies. In some embodiments, currency can be input monthly or weekly, and exchange rates can also be input weekly or monthly and then used in the currency calculation when converting weeks to other granularities (e.g., months).

An example Period dimension can include members that are default granularities, such as weekly, monthly, quarterly, yearly, and the like. As will be described with reference to FIGS. 5A and 5B, 6, and 7, the Period dimension can define a granularity for a given data element in some examples, and in other examples a data element specific granularity an be defined.

In some examples, members of these dimensions and/or combinations of members of these dimensions can represent data elements. For example, entity 1 can have a revenue account, an expense account, and the like. A combination of a given scenario, entity 1, and one of these accounts can be a data element, or each individual dimension member (e.g., the given scenario, entity 1, and the account) can be a separate data element. A plurality of combinations for members of these dimensions can be considered a cross-section of the multi-dimensional data.

In some embodiments, the various data elements within the multi-dimensional data model can have different granularities. For example, the revenue account of entity 1 can be have a weekly granularity while the expenses account of entity 2 can have a monthly granularity. Based on inputs received from a user, a cross-section of the multi-dimensional data can be requested for display, including combinations of data that include mixed data granularities. For example, the selection can request combinations between members of entities, accounts, and scenarios that have different granularities. As will be further detailed with reference to FIG. 11, valid combination rules can be generated in order to filter certain invalid combinations when processing a selected cross-section.

In some embodiments, conversion calculations 304 can be used to map between different levels of granularity (e.g., weekly to monthly, monthly to weekly, and the like) to enable display within a given form. For example, cube 306 can represent multi-dimensional data after performed conversion calculations so that data of mixed granularity that represents the requested cross-section of data can be displayed. Conversion calculations will be further detailed below.

FIGS. 4-10 illustrate an example graphical user interfaces for managing mixed data granularities according to example embodiments. Example user interfaces provide for configuring granularities for various combinations of data, such as a combination of a first member of a first dimension and a second member of a second dimension. For example, members of the dimension Entity can be planned at different granularities when they are combined with members of the dimension Accounts. In this circumstance, a displayed user interface can provide configuration options for combinations of the Entity and Account dimensions, and a selection for different granularities of different combinations can be received. Similar functionality can be extended to different dimensions or combinations with a higher number of dimensions. The example graphical user interfaces depicted in FIGS. 4-10 can be displayed using a computing device, such as computer system 110. The user interface can leverage any suitable technologies to accomplish the described functionality.

Figure 4:
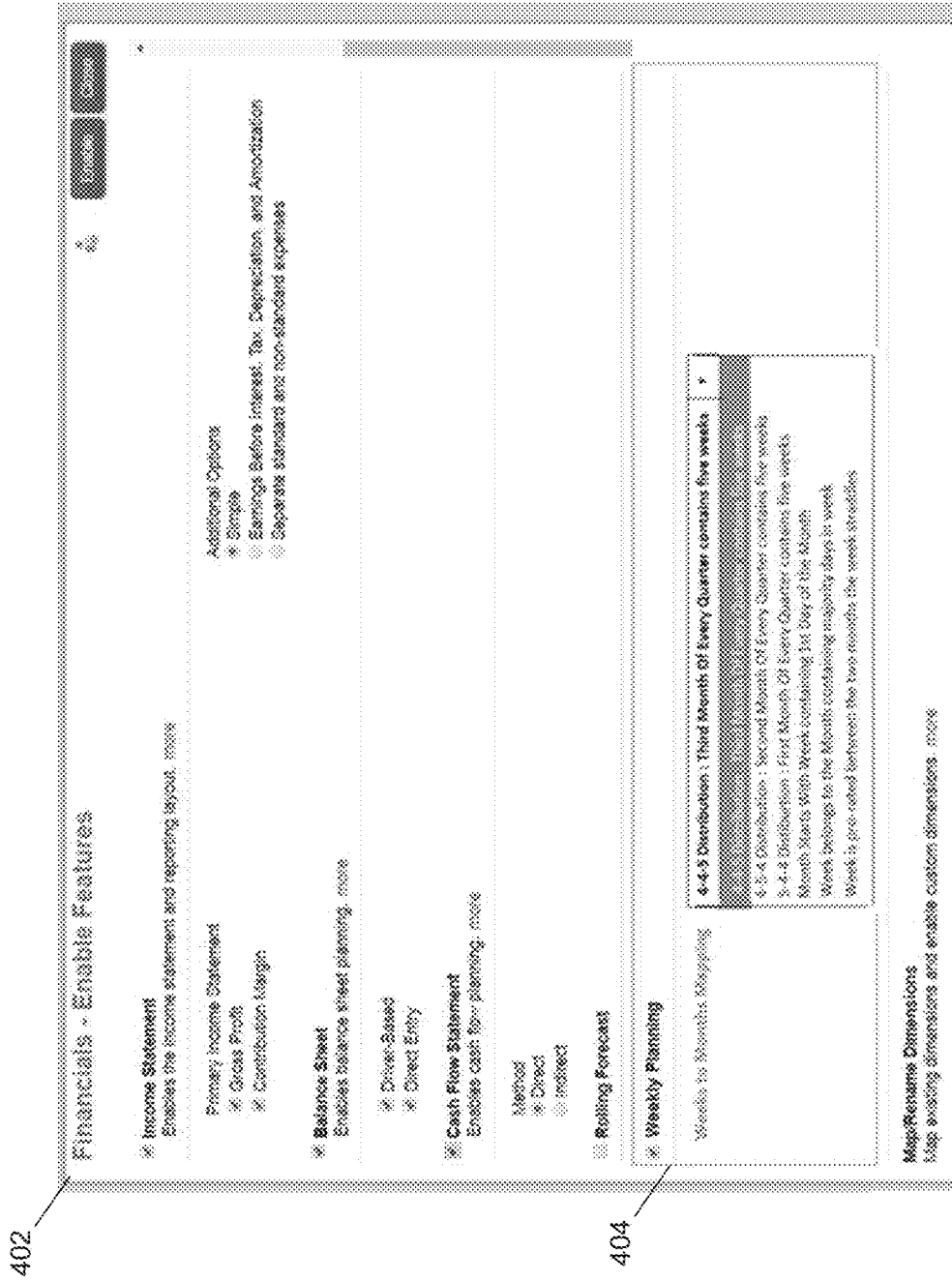
FIG. 4 illustrates an example graphical user interface for configuring data granularities according to an example embodiment.

FIGS. 4-7 illustrates example graphical user interfaces for configuring data granularities according to example embodiments. For example, a wizard that includes a plurality of graphical user interfaces can be used to configure data granularities in the multi-dimensional data model. With reference to FIG. 4, weekly granularity for some data elements can be configured by the provided user interfaces. User interface 402 illustrates a configuration interface for the multi-dimensional data and user interface element 404 illustrates a form for selecting weekly granularity and configuring the weekly granularity. For example, user interface element 404 can include a check box form for enabling weekly granularity and a drop down menu for selecting a configuration for the weekly granularity.

In some embodiments, at least 6 definition options are provided for weekly granularity: 4-4-5-4 weeks in first month, 4 weeks in second month, 5 weeks in third month and so on; 4-5-4-4 weeks in first month, 5 weeks in second month, 4 weeks in third month and so on; 5-4-4-5 weeks in first month, 4 weeks in second month, 4 weeks in third month and so on. The below table illustrates three examples of types of weekly definitions that can be implemented by embodiments.

|  | January | February | March | April | May | June | July | August | September | October | November | December |
|---|---|---|---|---|---|---|---|---|---|---|---|---|
| 445 | 4 | 4 | 5 | 4 | 4 | 5 | 4 | 4 | 5 | 4 | 4 | 5 |
| 454 | 4 | 5 | 4 | 4 | 5 | 4 | 4 | 5 | 4 | 4 | 5 | 4 |
| 544 | 5 | 4 | 4 | 5 | 4 | 4 | 5 | 4 | 4 | 5 | 4 | 4 |

In some embodiments, a new financial month can start with the week containing the 1st of that month. In other words, if one of the days in the reporting week contains the first day of a particular month, then that week "belongs" to that month. In some embodiments, the month can be determined by which month the majority of the days in that month belong. For example, if the week commences June 28th, then the week has three days in June and four in July—so this week "belongs" to July as more days in the week are from that month. In some embodiments, a week can be pro-rated between the two months the week straddles. For example, for weeks that have dates in two months, the output is assumed to accrue evenly over the period (e.g., for the week commencing June 28th three-sevenths of the output would be included in June and four-sevenths would be included in July).

Figure 5A:
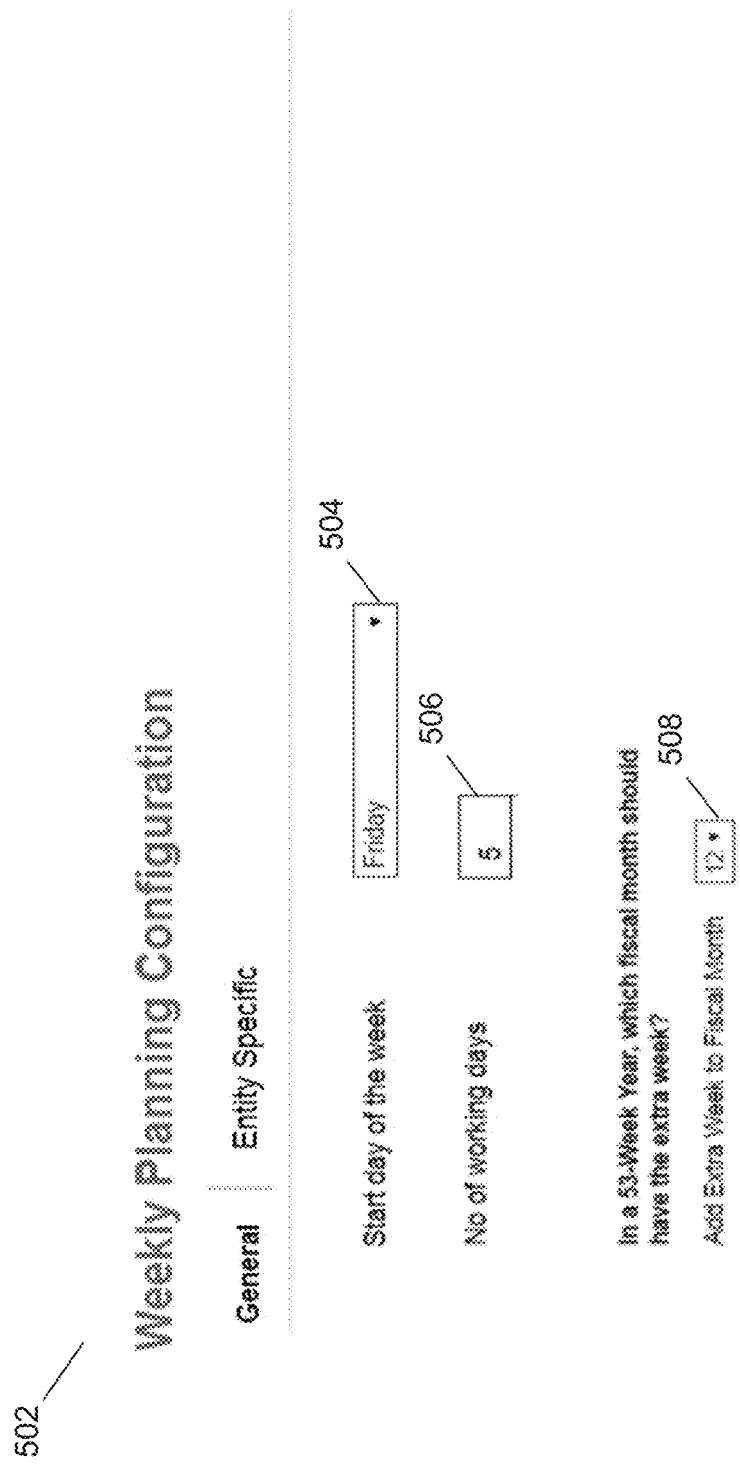
FIG. 5A illustrates an example graphical user interface for configuring a weekly data granularity according to an example embodiment.

Other suitable weekly granularity definitions can also be implemented. In addition, suitable mappings between weeks to quarters or years (e.g., based on the weeks to months mapping, and then months to quarters/years) can be implemented. With reference to FIG. 5A, the weekly granularity can further be defined by selecting additional configuration details. For example, for a given scenario (e.g., planning scenario), default weekly configuration details can be selected. In some embodiments, using user interface elements 504, 506, and 508, a start for the day of the week can be selected, a number of working day scan be selected, and a configuration for adding weeks to a month in a 53-week year can be selected.

Figure 5B:
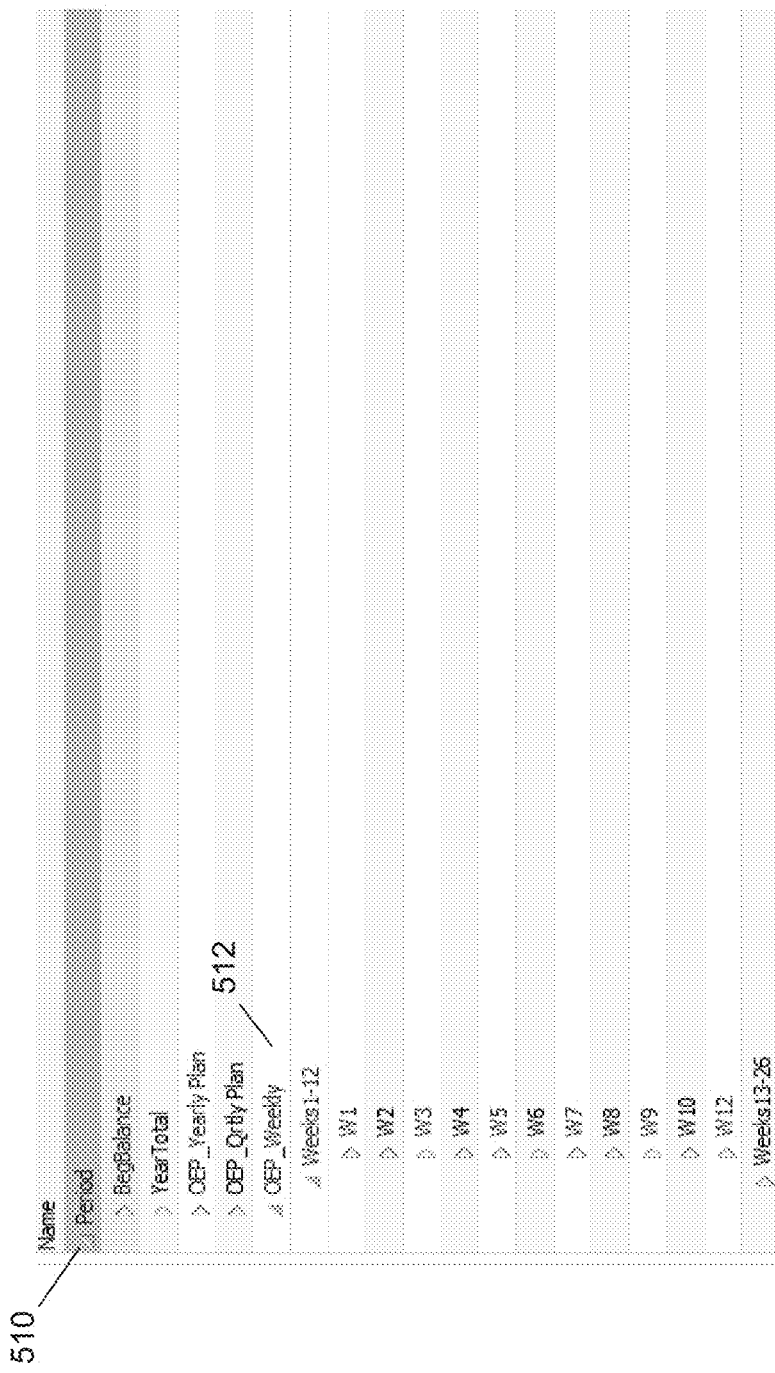
FIG. 5B illustrates an example implementation of a period dimension with a weekly configuration according to an example embodiment.
Figure 6:
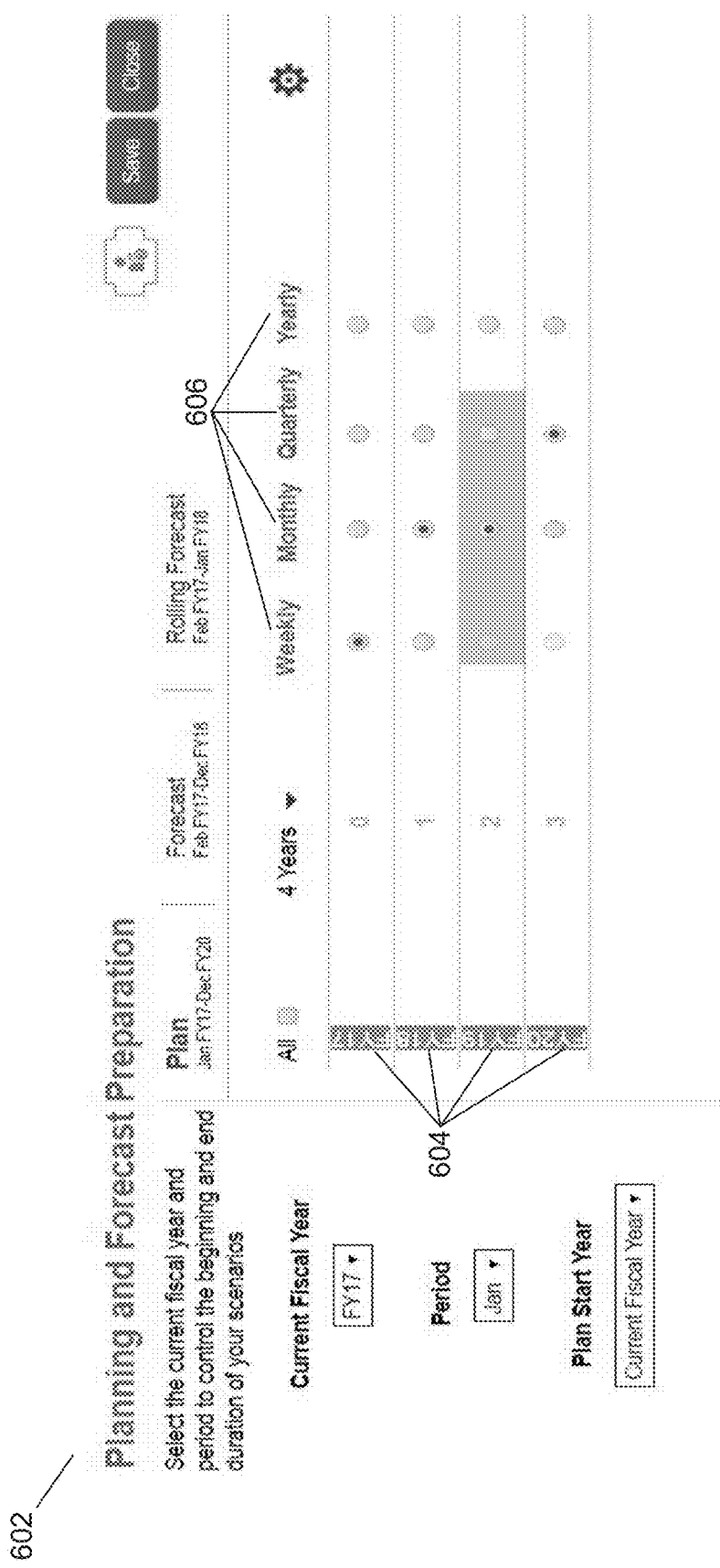
FIG. 6 illustrates another example graphical user interface for configuring data granularities according to an example embodiment.

FIG. 5B illustrates an example implementation of a period dimension with a weekly configuration according to an example embodiment. For example, a scenario where weekly granularity is enabled can include a default weekly logical structure within the data model that includes 52 or 53 week members. Period dimension 510 shows a number of logical structures, such as a yearly plan, quarterly plan, and weekly plan 512.

In some embodiments, when a user indicates a business process (member of accounts, entity, and the like) is performed at a weekly level, the corresponding period dimension can be seeded with 52/53 weekly members as indicated below. These weekly members can be enabled for the business process (and cubes) for which weekly planning is enabled. In some examples, either all weekly members are enabled for a plan type or none of them can be enabled. Other examples can include other implementations that allow partially enabling weekly members.

As mentioned above, the customer can choose different granularity of planning for different years e.g. current year can be planned at weekly level while year 2 at monthly level, year 3 at quarterly level and year 4 onwards at yearly level. The weeks to months and months to weeks conversion rules can ensure the weeks and months values are aligned as per the configurations and the months show the appropriate aggregate values from the weeks (based on the time balance property of accounts) and similarly the monthly values are appropriately allocated to weeks. The user has flexibility to plan at weekly level but also review the values at a monthly level. Similarly, the user can plan at a monthly level and allocate the value to weeks With reference to FIG. 6, granularities can be selected for various data elements, such as combinations for members of scenarios, years, and other suitable dimensions. In some embodiments, example combinations or cross-sections of data include a planning scenario for entity 1 over year 2018 that is planned at a weekly granularity, a forecasting scenario for entity 2 over year 2019 that is forecasted at a monthly granularity, and the like. In some embodiments, users can control a granularity of planning by multiple dimensions and configure weekly planning by any number of dimensions (Scenario, Year, Entity, Accounts, and the like). For example, 2017 can be planned at weekly granularity and forecast at monthly granularity, or for entity 1 expenses can be planned weekly while for entity 2 expenses can be planned monthly and revenue can be planned weekly.

This dynamic granularity selection allows for planning at a business model level rather than an application level. An application can be made up of multiple cubes catering to different planning attributes (e.g., Financial, Workforce, Projects, Capital, and the like). Weekly planning may or may not apply to all of the business processes and/or cubes in the application. Users can indicate if financials are planned by week whereas for capital, the lowest level of granularity might be monthly. In some embodiments, weekly planning for a given data element does not require weekly planning for all cubes. For example, a user can enable weekly planning for one or more cubes (e.g., Plan 1, Plan 2, Plan 3).

User interface 602 illustrates a planning scenario where the current fiscal year is depicted as 2017. Years 604 represents the years 2017, 2018, 2019, and 2020, while periods 606 represent weekly, monthly quarterly, and yearly granularities. For each of years 604, a period 606 can be selected as a default granularity. In the illustrated example, 2017 is planned at a weekly period, 2018 is planned at a monthly period, 2019 is planned at a monthly period, and 2020 is planned at a quarterly period. In some embodiments, a given year (e.g., 2017) can include multiple granularities, such as weekly for a first quarter, monthly for a second quarter, and quarterly for the remaining two quarters.

As will be further illustrated, the period dimension in combination with a given year and a given scenario can define granularity at a default level, however individual data elements (e.g., members of a dimension or combinations of members of multiple dimensions), such as descendants of entity 1, can be have varying granularities (e.g., for different accounts) over the given year and scenario.

Figure 7:
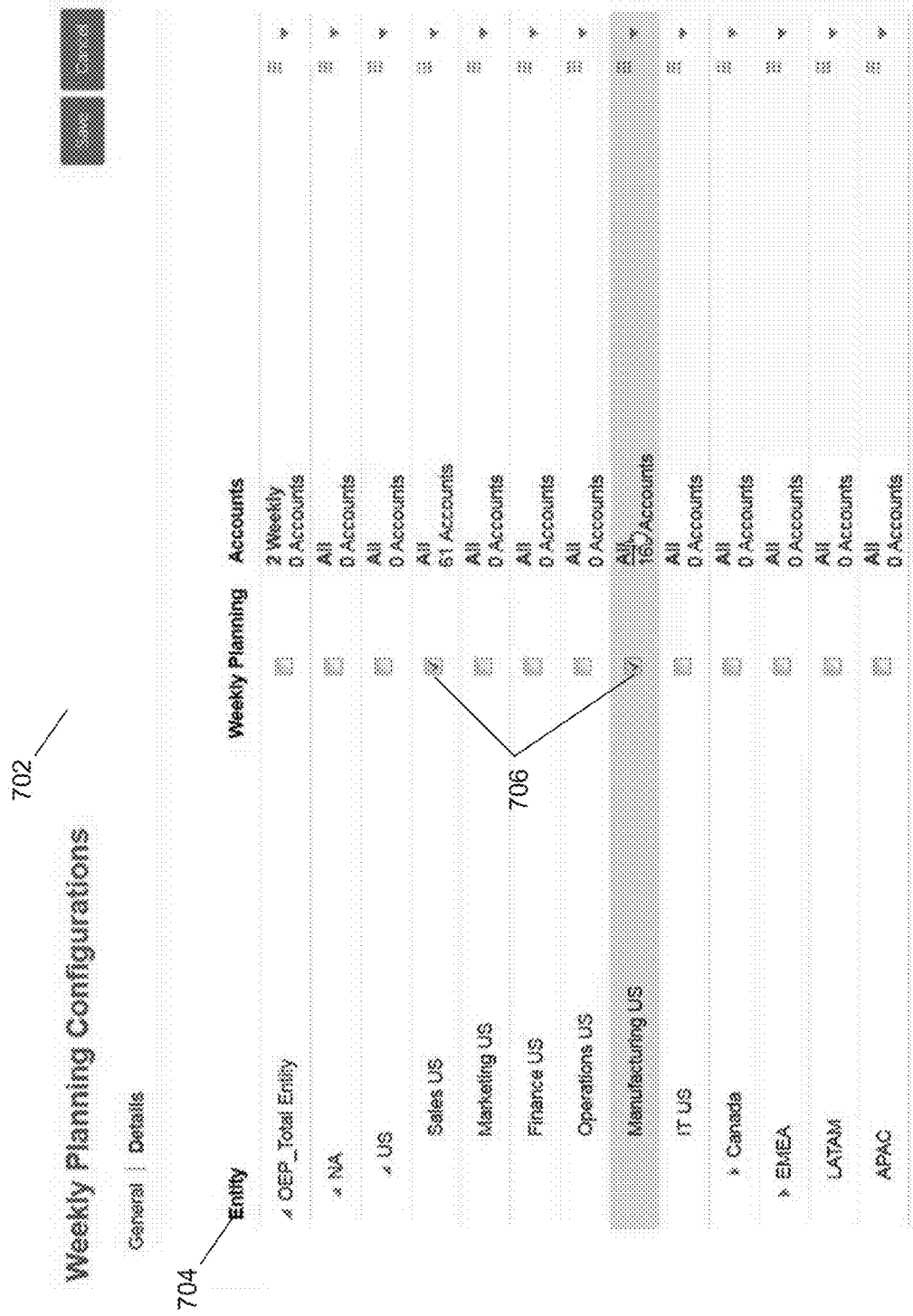
FIG. 7 illustrates an example graphical user interface for configuring a weekly data granularity in a hierarchical multi-dimensional data model according to an example embodiment.

With reference to FIG. 7, graphical user interface 702 illustrates an interface for configuring weekly planning for members of dimension 704, which is Entity in the illustrated example. The members of dimension 704 illustrate a hierarchical structure, where a parent node (e.g., US) includes a number of child nodes, descendants, or members (e.g., Sales US, Marketing US, Finance US, Operations US, Manufacturing US, IT US). As illustrated, separate data elements within the hierarchy of data elements in the entity dimension can be selected for a granularity that is different from the default granularity. In the illustrated example, Sales US and Manufacturing US are selected for a weekly planning granularity using user interface elements 706 while the remaining data elements are configured with the default granularity (e.g., monthly or weekly).

For various organizations, weekly level planning is often used for a subset of the account structures. For example, in retail weekly planning may be prepared for sales and margin. For operational models, weekly planning may be for the business drivers and not for all accounts. In some embodiments, a level of detail per account group can be further configured. For example, in financials, weekly planning could be for product revenue and not for support revenue or other revenue. The level of granularity can also vary by Entity (e.g., some entities may want to plan product revenue at weekly level while other entities may plan at a monthly level). The presented embodiments allow for a data model with dynamic granularity that is a natural extension of such real-world circumstances.

In some embodiments, once granularities have been selected for the various dimensions and/or data elements within the various hierarchical dimension, selections can be received from users to display cross-sections of the multi-dimensional data. For example, embodiments of display forms can include the weekly members defined in the period dimension. Weeks can be placed for the Account grouping for which weekly planning is enabled. For the Account groupings that are not planned at a weekly level the display forms can be configured with monthly/quarterly/yearly members. In some embodiments, dashboards can place the weekly members properly to facilitate analysis and reporting. As further detailed herein, conversion calculations associated with forms are provided to move the data from week members to the corresponding months and vice a versa.

Figure 8:
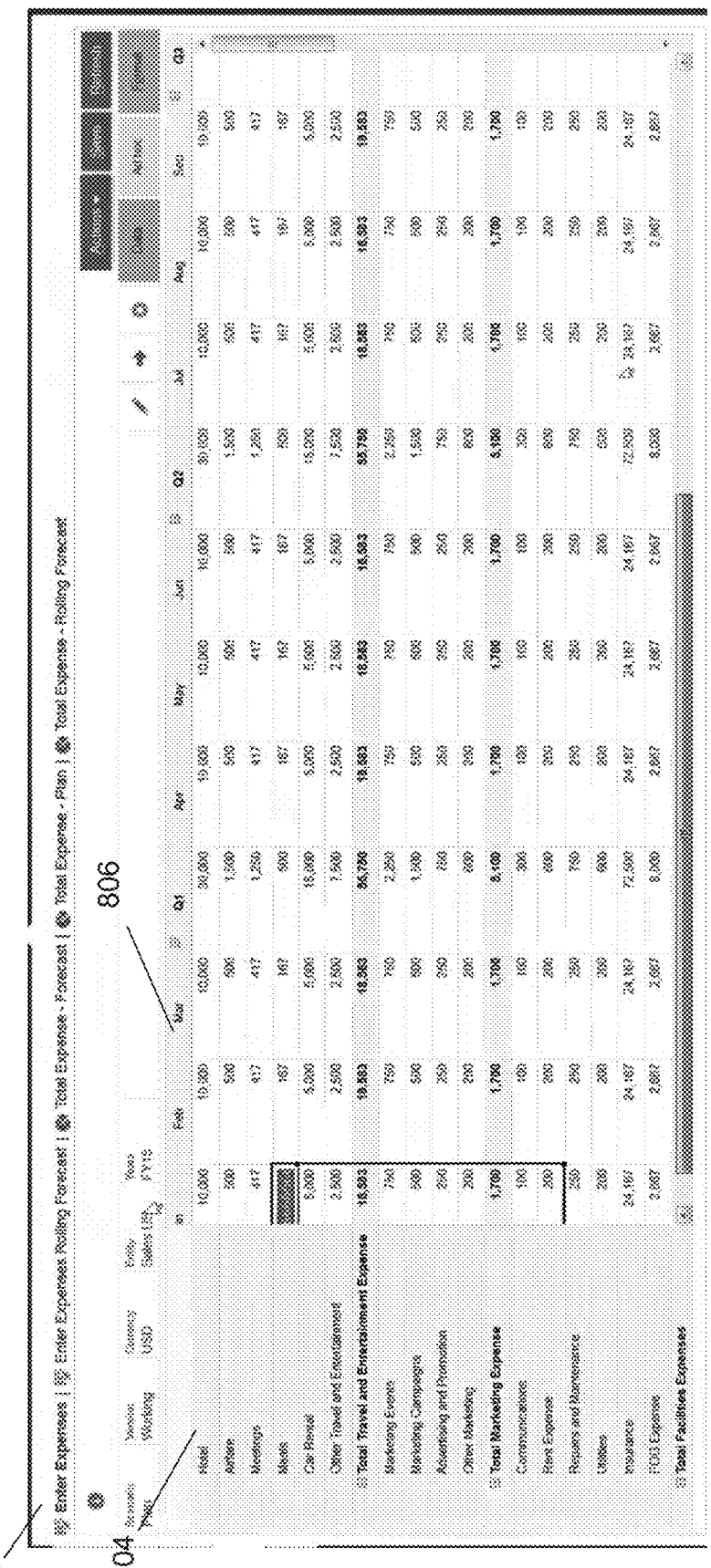
FIG. 8 illustrates an example graphical user interface that displays mixed data granularities according to an example embodiment.

With reference to FIG. 8, graphical user interface 802 illustrates a display of a cross-section of a multi-dimensional hierarchical data model. The illustrated example represent a cross-section of expenses (e.g., a member of the Accounts dimension) for the plan Scenario over year 2015 and for the entity sales US. For example, different data elements (or child nodes, descendants, or members) of expenses for US sales are listed at user interface element 804. The planned expense data for US sales over year 2015 is displayed in grid 806, which is configured in a monthly setting.

In some embodiments, the monthly display configuration illustrated in FIG. 8 can be based on one or more driver dimensions for the selected cross-section of data. A dimension can be considered a driver dimension when it is a required dimension in a selected cross-section of data and to indicate that configuration information for the driver dimension are a reference point when configuring the selected cross-section of data (e.g., configuring the display of the cross-section). In the illustrated example, Entity (e.g., sales US) can be identified as a driver dimension for the selected cross-section, and the monthly display configuration can be based on a monthly granularity for this member of the Entity dimension.

Figure 9:
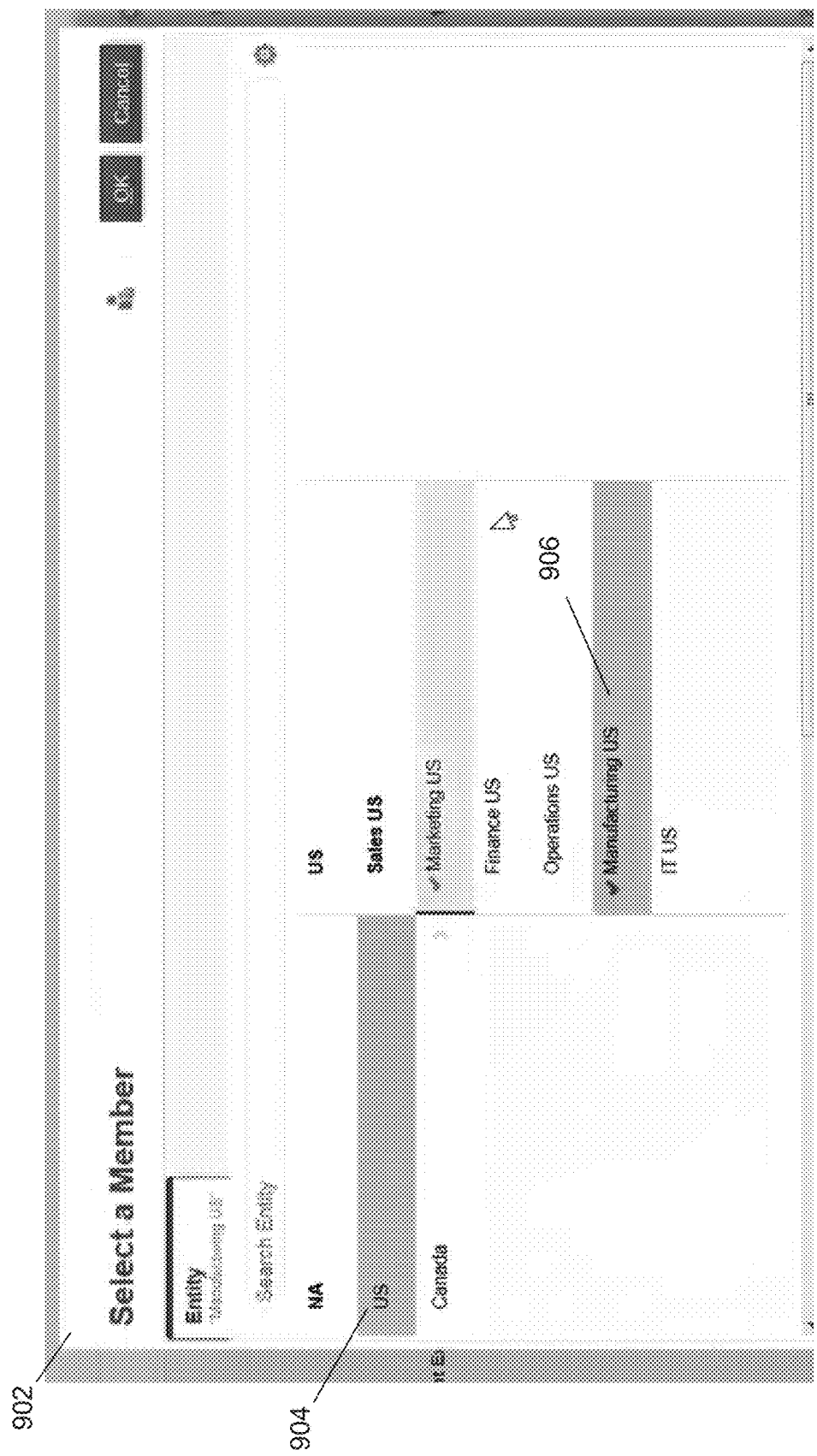
FIG. 9 illustrates an example graphical user interface for receiving a selection of data for display according to an example embodiment.

In some embodiments, the member of the Entity dimension displayed can be changed based on a new selection. With reference to FIG. 9, graphical user interface 902 illustrates a user interface for selecting a cross-section of data in the multi-dimensional data model. The illustrated example depicts a member of the Entity dimension US 904 and descendants of that member. Manufacturing US 906, a new member of US 904, is selected for display.

Figure 10:
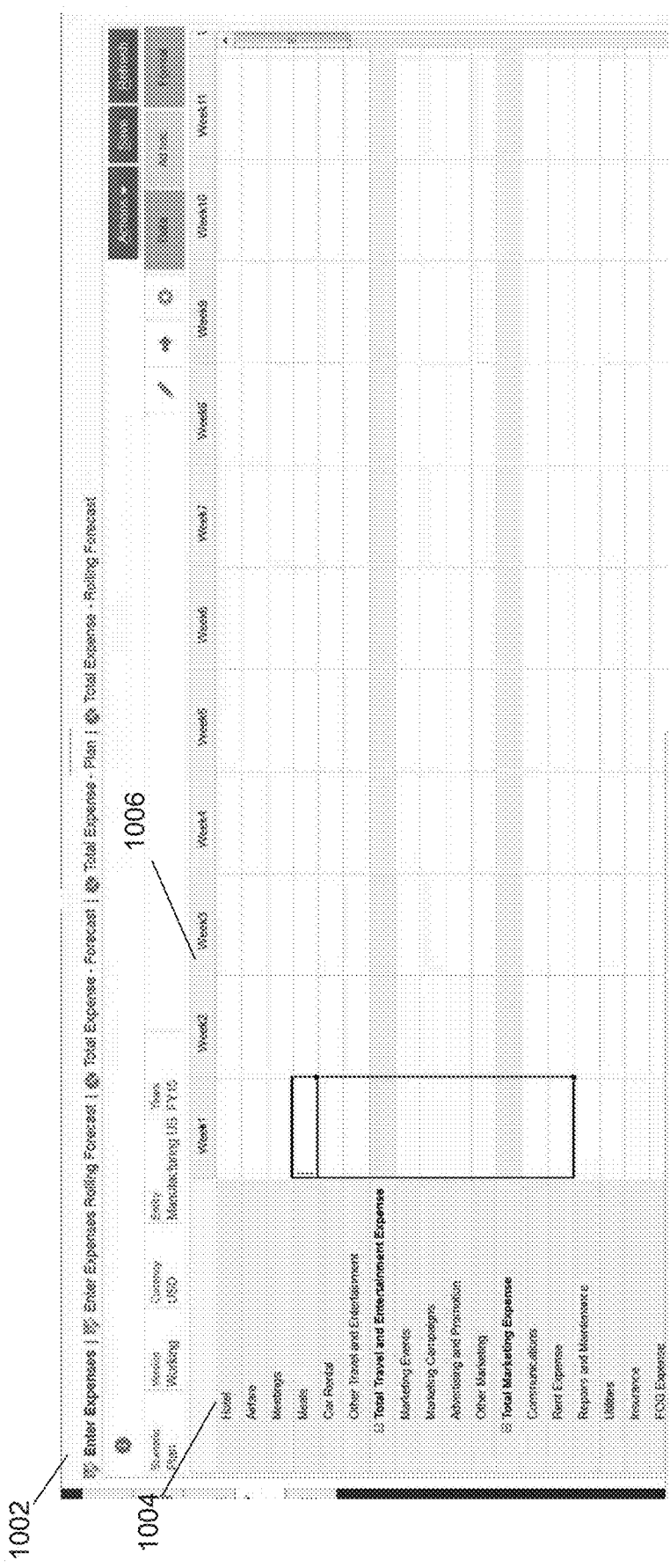
FIG. 10 illustrates another example graphical user interface that displays mixed data granularities according to an example embodiment.

With reference to FIG. 10, graphical user interface 1002 illustrates a display of a cross-section of a multi-dimensional hierarchical data model according to the selections from FIG. 9. The illustrated example represent a cross-section of expenses for the plan Scenario over year 2015 and for the Entity manufacturing US. For example, different data elements (or child nodes, descendants, or members) of expenses for manufacturing are listed at user interface element 1004. In contrast to FIG. 8, grid 1006 is displayed in a weekly configuration rather than a monthly configuration based at least in part on the new selection of manufacturing US.

In some embodiments, selected cross-sections of data may not have the same granularity. For example, entity 1 of the Entity dimension can have members entity 1-1 and entity 1-2. For a given year entity 1-1 can be planned weekly while entity 1-2 is planned monthly. A request to display a cross-section of data that includes this plan for entity 1-1 and entity 1-2 can result in an incompatibility. Embodiments perform conversation calculations on the planned data for one of entity 1-1 or entity 1-2 to map the data from one granularity to the other (e.g., weekly to monthly or monthly to weekly. As a result, the cross-section of data can be displayed in a manner similar to FIGS. 8 and 10 (e.g., in a weekly setting even though some underlying data is not at a weekly granularity or in a monthly setting even though some underlying data is not at a monthly granularity). In some embodiments, display forms can have spreading/shrinking functionality or spreading/shrinking logic to spread monthly data into a weekly display configuration or to shrink weekly data into a monthly display configuration. In some embodiments, the spreading/shrinking logic can be provided at another layer of the application (e.g., business logic layer).

In some embodiments, a rolling forecast scenario can be provided that allows a user to select a number of rolling weeks for a forecast. For example, a rolling forecast can including 13, 26, 52, or any other suitable number of rolling weeks. Data entry forms provide forms for configuring the rolling forecast when it is enabled. Either valid combinations or sub-variables can be leveraged to manage the number of weeks available for a rolling forecast. For example, a rolling forecast can have the following sub-variables for managing the rolling weeks:

| Weekly SubVars | Explaination | Example |
| --- | --- | --- |
| OEP_WeeklyPlanRange | Used to define the Year Range for Scenario - Plan that is performed at the Weekly Level | FY17:FY18 |
| OEP_WeeklyRFRange | Used to define the Year Range for Scenario - Forecast that is performed at the Weekly Level | FY16 |
| OEP_WeeklyFCSTRange | Used to define the Year Range for Scenario - Rolling Forecast that is performed at the Weekly Level | FY16:FY17 |
| OEP_ActWeeks | Used to define the Weeks that should be displayed on a form for Rolling forecast from Actuals | Week 20:Week 27 |
| OEP_WeeklyRange | Used to define the Weeks that should be displayed on a form for Rolling forecast form for the First Year of Rolling Forecast that is the Current Year. These are the future periods | Week 28:Week 52 |
| OEP_WeeklyYr2Range | Used to define the Weeks that should be displayed on a form for Rolling forecast form for the 2nd Year of Rolling Forecast that is the Current Year. These are the future periods | Week 1:Week 27 |

In some embodiments, allowing cross-sections of data with mixed granularities to be selected for processing or display includes management of the invalid data combinations that can occur based on the selected the cross-section. Embodiments generate rules for valid combinations based on a selected cross-section of data and identified anchor dimensions for the selection. Valid combinations provide the defining of rules, or valid combination rules, which can filter certain intersections of data when performing data combinations. Valid combination groups define dimensions to be included in a selection where one or more of those dimensions are identified as anchor dimensions. Non-anchor dimensions can be identified as required in a selection or not required. A selection can also define whether the anchor dimension members not specified or referenced will be valid or invalid.

In some embodiments, the selection of the cross-section of data can be received from a user and may represent a custom cube of data to be displayed to the user. For example, a user can define specific data elements (or specific members of a plurality of dimensions) and the system can generate a custom view of the cross-section of data. Accordingly, the valid combination rules allow for efficient manipulation of the multi-dimensional data model.

In embodiments, anchor dimensions are required dimensions in a cube that is used in the valid combination evaluation. In embodiments, if a non-anchor dimension is required, a cube that does not use that non-anchor dimension can ignore the valid combination group where that non-anchor dimension is tagged as required as it evaluates the valid combinations. In embodiments, if a non-anchor dimension is not required, a cube that does not use that non-anchor dimension can still evaluate any valid combination group that includes that non-anchor dimension as not required and evaluate the combinations of any other dimensions in the valid combination group in use in the cube. In some embodiments, anchor dimension members that are not explicitly configured are valid by default, but can be marked invalid.

FIG. 11 illustrates an example flow diagram for determining valid data combinations according to an example embodiment. In one embodiment, the functionality of FIGS. 11 and 12 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1102, configurations for a selected cross-section of data can be read. For example, selections for a cross-section of data from the multi-dimensional data model can be received. The selections can include members of various dimensions of data (e.g., entity 1-1, account 1, year 2018, scenario plan, and the like). The configuration information for the selections can be read, such as the granularity for the selected members of the dimensions and any combination specific granularities.

At 1104, member selections that participate in separate valid combination rules are identified. For example, member selections within the selected cross-section of data, such as entity 1-1, a member of the Entity dimensions and entity 1, are processed to identify which of the member selections will be included in separate valid combinations rules. In one example, entity 1 participates in valid combination rules when, for the selected cross-section of data, when one of its descendants has a first granularity (e.g., weekly) while a second descendant has a second granularity (e.g., monthly).

In some embodiments, a given member of a dimension can have a default granularity (e.g., monthly), yet a combination specific granularity different from the default granularity (e.g., weekly) can be received that includes the given member. For example, an entity 1-1 can have a default granularity of monthly, however a combination specific granularity of weekly for combinations of entity 1-1 and account 1-1 can be received. When the selected cross-section of data includes a combination of entity 1-1 and account 1-1, the combination specific granularity takes priority over the default granularity. Members selections can be identified as participating in separate valid combination rules when such a discrepancy between default granularity and combination specific granularity exists. The identified member selections can be added to an exclusion list in some embodiments.

At 1106, a for loop can be initiated that loops through the member selections identified at step 1104. At 1108, it can be determined whether the given member selection (being processed within a loop of the for loop) is excluded from a default granularity (e.g., weekly granularity). When the given member selection is not excluded, the functionality can move to 1110. When the given member selection is excluded, the functionality can move to 1112.

At 1110, the given member selection can be added to weekly granularity. In addition, an inverse selection can be added to monthly granularity to ensure that the selected cross-section of data does not result in retrieval of an invalid combination when performing data retrieval according to the selection. At 1112, the given member selection can be added to weekly granularity.

At 1114, it is determined whether more member selections are available to process. For example, 1114 loops back to 1106 until the for loop has iterated over each of the member selections identified in step 1104. Once the for loop has exhausted the identified member selections, valid combination rules are generated at 1116. These valid combination rules are based on the member selections that are added to weekly granularity, the inverse member selections that are added to monthly granularity, and the remaining member selections that are added to monthly granularity by the for loop. Pseudocode for generating the valid combination rules and example data structures generated by performing the pseudocode are further detailed herein.

The example pseudocode can be configured to process any suitable selections of data. In the example detailed herein, the multi-dimensional data model includes dimensions Entity, Account, Scenario, Year, and Period. Combinations that include a given scenario and a year period are set as valid. In some examples, weekly and monthly periods have both weekly and monthly granularities enabled, for example as planning granularities.

In some embodiments, for each scenario, year, and period combination that is weekly or monthly, valid combinations rules are generated. By default, combinations of dimensions involved are considered valid for weekly and monthly periods for the scenarios defined. Based on the members excluded for each dimension, various valid combination rules are added to filter invalid combinations. In some implementations, the exclusion principle is leveraged, that is, instead of identifying what is valid, invalid combinations are identified. The pseudocode below illustrates a sample algorithm for generating a data structure that stores a plurality of valid combination rules:

| Data Structures |
|---|

```
MemberSelection:
        -       MemberMapping[ ] mappings
                // Contains an array of Member Mapping object
MemberMapping
        -       memberName
                // Name of member
        -       dimensionName
                //Name of dimension
        -       Function
                //Example: Children, Descendants
        -       isExcluded
                //Set to true if member mapping is to be excluded.
                //Default is false & will indicate inclusion.
ValidCombination
        -       List<Dimension>
                //List of dimension names involved
        -       List<Rule>
                // List of rule
        -       MemberSelection
                //Each rule is a member selection
Parameters
        o   Period dimension members define the granularity of Planning.
            Descendants(Weekly) indicate weekly planning, Descendants(YearTotal) indicate
            monthly planning.
        o   The platform provides the ability to define valid combinations & allows
            process/display of the valid combinations.
Input
        List<String> driverDimensions
        List<MemberSelection> weeklyConfigurations
Algorithm/pseudocode
def List<MemberMapping> exclusionListForBaseDriver;
//Stores the base driver dimension on which granularity is defined.
def List<Rule> validCombinations;
//Is the output valid combination
def numDimensions = driverDimensions.length;
//Number of dimensions participating in deriving the granularity
        for each memberselection in weeklyConfiguration{
                def MemberSelection currSelection = memberSelection;
                //Assign to a temp variable
                for each memberMapping in currSelection.mappings{
                        if (firstElement){
        exclusionListForBaseDriver.add(memberMapping);
//For every member selection of base dimension for which a rule will be created
needs to be excluded from the default rule.
                        }
                        if(is next mapping available){
//There is a subset of succeeding driver dimensions available. Do nothing.
                                continue;
                        }else{
                                if( index == numDimensions){
//The member selection for last driver dimension.
                                        for( i = numDimensions ; i > 0 ; i--){
//A rule is added for dimension member mappings looping for over the dimensions.
create new rule & add to the valid combination list
for (j=0; j < mappings.length; j++){
        if( j < i){
        add memberMapping to the rule
        continue;
        }
if(j < numDimensions){
        if(j == i){
        add memberMapping[j] to rule.
        set excluded to true;
        }else{
        add allMembersOfDimMapping to rule.
        }
        }
        }
if(i == numDimension){
        add weeklyMapping to the rule.
                }else{
        add monthlyMapping to the rule.
                }
        }
}else{
        create new rule & add to the valid combination list
        add all member mappings processed so far to the rule.
```

-continued

Data Structures

For rest of the pending dimensions, add allMembersOfDimMapping to rule.
add monthlyMapping to the rule.
}
}
}
}
}
create new rule & add to the valid combination list
Add addMembersOfDimMapping for every dimension.
For the first driver dim, add exclusionListForBaseDriver & set isExcluded to true.
OUTPUT
List<Rule> validCombinations;

Disclosed is an example of a sample input, sample generation of the rules data structures based on the above pseudocode code, and sample output of valid combination rules. The sample provides valid combination rules that are generated based on a subset of dimensions, namely Scenario, Year, Entity and Account. In this case, weekly planning is the default for 2018 and the plan Scenario. The following three members of the Entity dimension include combination specific granularities: Sales US—Revenue (a member of Account) planning has a weekly granularity while other combinations have a monthly granularity; Manufacturing US—Expense (a member of Account) Planning has a weekly granularity while other combinations have a monthly granularity; and Finance US—combinations have a monthly granularity.

```
INPUT
Member Selections : [
{ mappings : mbrName:"SalesUS",dimension:"Entity",function:"Descendants"},
{mbrName:"RevenuePlanning",dimension:"Account",function:"Descendants"}]},
{ mappings: [ {mbrName:"ManufacturingUS",dimension:"Entity",function:"Descendants"},
{mbrName:"ExpensePlanning",dimension:"Account",function:"Descendants"}]},
{ mappings: [ {mbrName:"Finance US",dimension:"Entity",function:"Descendants"}]} ]
Driver dimensions: ["Entity","Account"]
Generation of Rules:
After processing 1st Element in memSelection:
```

```
After processing 1st mapping:    exclusionListForBaseDriver : [ {mbrName:"Sales
US",dimension:"Entity",function:"Descendants"} ]
After processing 2nd mapping: Rules : [ [{mbrName:"Sales
US",dimension:"Entity",function:"Descendants"},{mbrName:"RevenuePlanning",dimension:"Account",
function:"Descendants"}, [mbrName:"Weekly",dimension:"Period",function:"Descendants"}],
[{mbrName:"Sales US",dimension:"Entity",function:"Descendants"},
{mbrName:"RevenuePlanning",dimension:"Account",function:"Descendants","isExcluded":true},
{mbrName:"Monthly",dimension:"Period",function:"Descendants"}] ]
/* At this time, the algorithm adds 2 rules based on first member selection. The first rule is setting
the Entity/Account combination to Weekly. When this is defined, the invalid combinations for
particular granularities are also defined. Hence we exclude the accounts that are included in the
first rule & make all of that valid for monthly granularity for that Entity. */
After processing 2nd Element in memSelection:
```

```
After processing 1st mapping: exclusionListForBaseDriver : [ {mbrName:"Sales
US",dimension:"Entity",function:"Descendants"} , {mbrName:"Manufacturing
US",dimension:"Entity",function:"Descendants"}]
After processing 2nd mapping: Rules: [ [{mbrName:"Sales
US",dimension:"Entity",function:"Descendants"},{mbrName:"RevenuePlanning",dimension:"Account",
function:"Descendants"}, {mbrName:"Weekly",dimension:"Period",function:"Descendants"}],
[{mbrName:"Sales US",dimension:"Entity",function:"Descendants"},
{mbrName:"RevenuePlanning",dimension:"Account",function:"Descendants","isExcluded":true},
{mbrName:"Monthly",dimension:"Period",function:"Descendants"}],
[{mbrName:"ManufacturingUS",dimension:"Entity",function:"Descendants"},{mbrName:"ExpensePlanning",
dimension:"Account",function:"Descendants"},{mbrName:"Weekly",dimension:"Period",
function:"Descendants"}],
[{mbrName:"Manufacturing US",dimension:"Entity",function:"Descendants"},
{mbrName:"ExpensePlanning",dimension:"Account",function:"Descendants","isExcluded":true},{mbrName:
"Monthly",dimension:"Period",function:"Descendants"}] ]
/* In this iteration, we add additional 2 rules based on the member selection.*/
After processing 3rd Element in memSelection:
```

```
After processing 1st mapping: exclusionListForBaseDriver : [ {mbrName:"SalesUS",
dimension:"Entity",function:"Descendants"} , {mbrName:"ManufacturingUS",
dimension:"Entity",function:"Descendants"}, {mbrName:"FinanceUS",
dimension:"Entity",function:"Descendants"}]
After processing 2nd mapping: Rules: [
[{mbrName:"SalesUS",dimension:"Entity",function:"Descendants"},
{mbrName:"RevenuePlanning",dimension:"Account",function:"Descendants"},
{mbrName:"Weekly",dimension:"Period",function:"Descendants"}],
```

-continued

```
[{mbrName:"SalesUS",dimension:"Entity",function:"Descendants"},{mbrName:"RevenuePlanning",dimension:
"Account",function:"Descendants","isExcluded":true},
{mbrName:"Monthly",dimension:"Period",function:"Descendants"}],
[{mbrName:"ManufacturingUS",dimension:"Entity",function:"Descendants"},{mbrName:"ExpensePlanning",
dimension:"Account",function:"Descendants"},
{mbrName:"Weekly",dimension:"Period",function:"Descendants"}],
[{mbrName:"ManufacturingUS",dimension:"Entity",function:"Descendants"},
{mbrName:"ExpensePlanning",dimension:"Account",function:"Descendants","isExcluded":true},
{mbrName:"Monthly",dimension:"Period",function:"Descendants"}],
[{mbrName:"FinanceUS",dimension:"Entity",function:"Descendants"},{mbrName:"Account",dimension:"Account",
function:"Descendants"},{mbrName:"Monthly",dimension:"Period",function:"Descendants"}] ]
/* Here since there was no mapping for Account dimension, we set all members of Account
dimension which is represented as Descendants(Account) to be valid for monthly granularity*/
After processing all member selections:
```

```
Rules : [ [{mbrName:"Sales
US",dimension:"Entity",function:"Descendants"},{mbrName:"RevenuePlanning",dimension:"Account",
function:"Descendants"}, {mbrName:"Weekly",dimension:"Period",function:"Descendants"}],
[{mbrName:"SalesUS",dimension:"Entity",function:"Descendants"},
{mbrName:"RevenuePlanning",dimension:"Account",function:"Descendants","isExcluded":true},
{mbrName:"Monthly",dimension:"Period",function:"Descendants"}],
[{mbrName:"ManufacturingUS",dimension:"Entity",function:"Descendants"},{mbrName:"ExpensePlanning",
dimension:"Account",function:"Descendants"},{mbrName:"Weekly",dimension:"Period",
function:"Descendants"}],
]{mbrName:"ManufacturingUS",dimension:"Entity",function:"Descendants"},{mbrName:"ExpensePlanning",
dimension:"Account",function:"Descendants","isExcluded":true},{mbrName:"Monthly",
dimension:"Period",function:"Descendants"}],
[{mbrName:"FinanceUS",dimension:"Entity",function:"Descendants"},{mbrName:"Account",dimension:"Account",
function:"Descendants"},{mbrName:"Monthly",dimension:"Period",function:"Descendants"}],
[{mbrName:"Entity",dimension:"Entity",function:"Descendants"}, {mbrName:"SalesUS",
dimension:"Entity",function:"Descendants","isExcluded":true] , {mbrName:"ManufacturingUS",
dimension:"Entity",function:"Descendants","isExcluded":true], {mbrName:"FinanceUS",
dimension:"Entity",function:"Descendants","isExcluded":true},
{mbrName:"Account",dimension:"Account",function:"Descendants"},
{mbrName:"Weekly",dimension:"Period",function:"Descendants"}] ]
/*At the end, the assumption we start with that all combinations are valid for weekly granularity is
added. Here since we define specific combinations for certain member selections for the base
dimension, those base dimension member selection are excluded so the specific rules get applied
for them */
```

Another representation of the valid combinations rules generated by the sample algorithm is:

| Scenario | Entity | Years | Period | Account | Plan Element |
| --- | --- | --- | --- | --- | --- |
| OEP_Plan | Descendants(Entity), Exclude(Finance US, Sales US, Manufacturing US) | FY15 | BegBalance, IDescendants(OEP_Weekly Plan) | Descendants(Account) | Descendants(Plan Element) |
| OEP_Plan | Finance US | FY15 | BegBalance, IDescendants(YearTotal) | Descendants(Account) | Descendants(Plan Element) |
| OEP_Plan | Sales US | FY15 | BegBalance, IDescendants(OEP_Weekly Plan) | IDescendants(OFS_Revenue Planning), Exclude(OFS_Bad Debt) | Descendants(Plan Element) |
| OEP_Plan | Sales US | FY15 | BegBalance, IDescendants(YearTotal) | Descendants(Account), Exclude(IDescendants(OFS_Revenue Planning)) | Descendants(Plan Element) |
| OEP_Plan | Descendants(Entity) | FY16 | BegBalance, IDescendants(YearTotal) | Descendants(Account) | Descendants(Plan Element) |
| OEP_Plan | Descendants(Entity) | FY17 | BegBalance, IDescendants(YearTotal) | Descendants(Account) | Descendants(Plan Element) |
| OEP_Plan | Manufacturing US | FY15 | BegBalance, IDescendants(OEP_Weekly Plan) | Descendants(OFS_Expense Planning) | Descendants(Plan Element) |
| OEP_Plan | Manufacturing US | FY15 | BegBalance, IDescendants(YearTotal) | Descendants(Account), Exclude(IDescendants(OFS_Expense Planning)) | Descendants(Plan Element) |

This illustrated example demonstrates a sample selection of a cross-section of data including four dimensions (two of which are driver dimensions), selected granularities that include a mix of monthly and weekly granularities, an example algorithm for processing the individual members of the dimensions, and a generated data structure with a plurality of valid combination rules to be used when performing data combinations based on the selected cross-section of data.

In some embodiments, data is retrieved from a database according to the selection and based on the valid combination rules. The combinations indicated as invalid by the plurality of rules are filtered from the retrieval. For example, a selection may include all members of the Period dimension, where for a given combination of data (e.g., given scenario, entity, year, and the like) weekly data is valid and monthly data is invalid. The monthly data can be filtered (e.g., removed) from the retrieved data before returning the results, thus ensuring that the invalid data combination is not further used (e.g., is not displayed to a user). In some embodiments, a similar example may occur where, for the given combination, weekly data is valid and all other data for other period members (e.g., monthly, quarterly, yearly, and the like) is invalid. In this instance, data for all the other period members can be filtered (e.g., removed) from the retrieved data before returning the results. In some embodiments, filtration of the invalid combinations occurs after the data is retrieved from a database (e.g., is a post-query processing/filtration technique).

These valid combination rules enable a multi-dimensional hierarchical data model to include individual combinations of dimensional data with differing granularities to be manipulated, processed, formatted, and displayed on a user interface. The data retrieved for the selection can be display in one or more forms that format the data. In some examples, conversion calculations can be used to display data with different granularities together. Example conversion calculations include weeks to months mappings and months to weeks mappings.

A conversion from weeks to months can depend on time balance & skip value properties of an account. Considering option=445 & first month=Jan:

| Time Balance property | Skip Value | Value at month level | Example |
|---|---|---|---|
| Flow/Fill | None | Aggregated week values in month. | January = W 1 + W 2 + W 3 + W 4, February = W 5 + W 6 + W 7 + W 8 March = W 9 + W 10 + W 11 + W 12 + W 13 |
| Fill | Zeros/ Missing & Zeros | Aggregated week values (non-zero) in month. | W 1 = 0, W 2 = 0, W 3 = 0, W 4 = 0 January = #missing |
| First | None | First week value in month. | January = W 1, February = W 5, March = W 9 |
| First | Missing | First non-missing week in month. | W 1 = #missing, W 2 = #missing, W 3 = 100, W 4 = 0, W 5 = #missing, W 6 = 0, W 7 = #missing, W 8 = 100, W 9 = #missing, W 10 = 100, W 11 = #missing, W 12 = #missing, W 13 = 100 January = W 3 = 100, February = W 6 = 0, March = W 10 = 100 |
| First | Zeroes | First non-zero week value in month. | W 1 = #missing, W 2 = #missing, W 3 = 100, W 4 = 0, W 5 = #missing, W 6 = 0, W 7 = #missing, W 8 = 100, W 9 = #missing, W 10 = 100, W 11 = #missing, W 12 = #missing, W 13 = 100 January = W 3 = 100, February = W 8 = 100, March = W 10 = 100 |
| First | Missing & Zeroes | First non-missing and non-zero value in month. | W 1 = #missing, W 2 = 0, W 3 = 100, W 4 = 0, W 5 = #missing, W 6 = 0, W 7 = #missing, W 8 = 100, W 9 = #missing, W 10 = 100, W 11 = #missing, W 12 = #missing, W 13 = 100 January = W 3 = 100, February = W 8 = 100, March = W 10 = 100 |
| Balance | None | Last week value in month. | January = W 4, February = W 8, March = W 13 |
| Balance | Missing | Last week having data in month. | W 1 = 100, W 2 = #missing, W 3 = 100, W 4 = #missing, W 5 = 100, W 6 = #missing, W 7 = #missing, W 8 = 100, W 9 = #missing, W 10 = 100, W 11 = 100, W 12 = #missing, W 13 = #missing January = W 3 = 100, February = W 8 = 100, March = W 11 = 100 |
| Balance | Zeros | Last non zero value in month. | W 1 = 100, W 2 = #missing, W 3 = 100, W 4 = 0, W 5 = 100, W 6 = 0, W 7 = #missing W 8 = 100, W 9 = 0, W 10 = 100, W 11 = #missing, W 12 = #missing, W 13 = 0 January = W 3 = 100, February = W8 = 100, March = W 10 = 100 |
| Balance | Missing & zeroes | Last non-missing and non-zero value in month. | W 1 = 100, W 2 = 100, Wk 3 = #missing, W 4 = 0, W 5 = 100, W 6 = 0, W 7 = #missing, W 8 = 100, W 9 = 0, W 10 = 100, W 11 = #missing, W 12 = 100, W 13 = #missing January = W 2 = 100, February = W 8 = 100, March = W 12 = 100 |
| Average | None | Average of weeks in month. | January = W 1 + W 2 + W 3 + W 4/4 February = W 5 + W 6 + W 7 + W 8/4 March = W 9 + W 10 + W 11 + W 12 + W 13/5 |
| Average | Missing | Average of weeks having data in month. | W 1 = 100, W 2 = #missing, W 3 = 100, W 4 = #missing, W 5 = 100, W 6 = #missing, W 7 = #missing, W 8 = 100, W 9 = #missing, W 10 = 100, W 11 = #missing, W 12 = #missing, W 13 = 100 January = (100 + 100)/2 = 100, February = (100 + 100)/2 = 100, March = (100 + 100 + 100)/3 = 100 |
| Average | Zeros | Average of non-zero week values in month. | W 1 = 100, W 2 = #missing, W 3 = 100, W 4 = 0, W 5 = 100, W 6 = 0, W 7 = #missing, W 8 = 100, W 9 = 0, W 10 = 100, W 11 = #missing, W 12 = #missing, W 13 = 100 January = (100 + 100)/3 66.67, February = (100 + 100)/3 = 66.67, March = (100 + 100 + 100)/3 = 66.7 |
| Average | Missing & Zeros | Average of week values having non-zero data in month. | W 1 = 100, W 2 = #missing, W 3 = 100, W 4 = 0, W 5 = 100, W 6 = 0, W 7 = #missing, W 8 = 100, W 9 = 0, W 10 = 100, W 11 = 0, W 12 = #missing, W 13 = 100 January = (100 + 100)/2 = 100, February = (100 + 100)/2 = 100, March = (100 + 100 + 100)/3 = 100 |

Example options for months to weeks mappings according to various embodiments are:

| Time Balance property | Skip Value | Value at week level | Example |
|---|---|---|---|
| Flow | None | Month value divided by no of weeks in month | January = 100, February = 100, March = 100<br>W 1 to W 4 = 100/4 = 25, W 5 to W 8 = 100/4 = 25,<br>Wk 9 to Wk 13 = 100/5 = 20 |
| First/Fill/Balance/Average | None | Same as in month | January = 100, February = 100, March = 100<br>W 1 to W 4 = 100, W 5 to W 8 = 100, Wk 9 to Wk 13 = 100 |
| First/Fill/Balance/Average | Zeroes/Missing & Zeroes | Same as in month except will not spread if month is zero. | January = 0<br>Wk 1 to Wk 4 = #missing |

Figure 12:
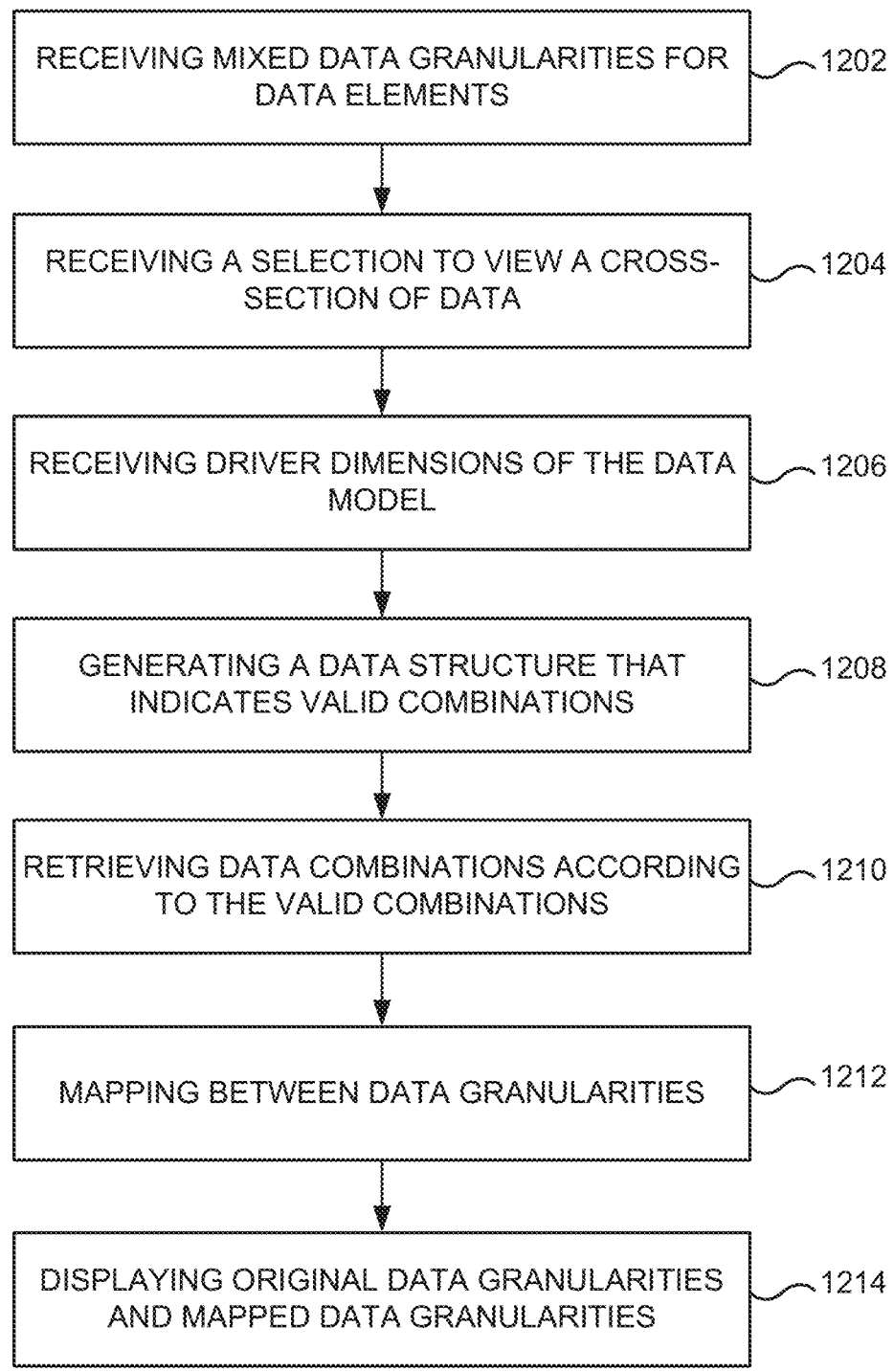
FIG. 12 illustrates an example flow diagram for managing mixed data granularities for a multi-dimensional data model according to an example embodiment.

FIG. 12 illustrates a flow diagram for managing data with mixed granularities in a multi-dimensional data model according to an example embodiment. At 1202, mixed data granularities can be received for data elements of the multi-dimensional data model. For example, the data model can include a plurality of dimensions (e.g., Entity, Accounts, Scenario, Year, Granularity, Period, and the like), that are, in some embodiments, hierarchical. Granularities can be received for data elements of the data model. For example, a granularity can be received for entity 1-1, a member of Entity. In another example, a granularity can be received for plan 2017, entity 1-1, and account 1-1 (which includes a combination of members of the dimensions Scenario, Entity, and Account). In some embodiments, a weekly granularity can be received for a first data element and a monthly granularity can be received for a second data element.

At 1204, a selection to view a cross-section of data elements in the multi-dimensional data model is received, the selection including a first data combination based on the first data element and a second data combination based on the second data element. For example, a selection of members of a plurality of dimensions (e.g., Entity, Accounts, Scenario, Year, Granularity) can be received from a user that includes the first data element with the selected weekly granularity and the second data element with the selected monthly granularity.

At 1206, one or more driver dimensions of the data model can be received. For example, one or more dimensions can be received from a user that represent the driver dimensions for the selection. At 1208, based on the driver dimensions and the received granularities, a data structure that indicates valid combinations of data elements can be generated. For example, using an algorithm similar to the example algorithm presented rules for valid combinations of data elements within the multi-dimensional data model can be generated according to the granularities for the data elements within the selection. The data structure can be similar to the rules based data structure in the presented example.

At 1208, based on the driver dimensions and the received granularities, a data structure that indicates valid combinations of data elements can be generated. For example, using an algorithm similar to the example algorithm presented, rules for valid combinations of data elements within the multi-dimensional data model can be generated according to the granularities for the data elements within the selection. The data structure can be similar to the rules-based data structure in the presented example. In some embodiments, the valid combinations rules can define the validity of combinations that include member of the Period dimension. For example, one member of the period dimensions (e.g., weekly) for a given combination can be defined as valid while the remaining members of the Period dimension (e.g., monthly, quarterly, yearly, and the like) can be defined as invalid.

At 1210, data can be retrieved based on the selection of cross-section of data and the valid combination rules. For example, data can be retrieved according to the received selection of the cross-section of data, where the data retrieval is filtered to remove combinations indicated as invalid by the valid combinations rules. In some embodiments, combinations that include members of the Period dimension defined as invalid by the rules can be filtered from the retrieved data (e.g., columns that include these combinations of data can be removed).

At 1212, the data of a first granularity can be mapped to data of a second granularity. For example, using one or more conversion calculations, monthly data can be mapped to weekly data or weekly data can be mapped to monthly data. In an embodiment, the weekly data of the first data element can be mapped to monthly data according to a predetermined conversion calculation.

At 1214, in a form, data of mixed granularity can be displayed together. For example, based on the conversion calculation, data of mixed granularity can be displayed in a similar format. In an embodiment, monthly data for the second data combination can be displayed based on the second data element and monthly data for the first data combination can be displayed based on the mapped monthly data.

The presented embodiments provide a number of benefits over conventional systems. In other multidimensional models, the system often requires a user to choose the granularity of planning at application level and it applies to various data combinations without customization (e.g., cubes (plurality of dimensions of data), years, accounts, and other dimensions). For example, weekly planning may create a simple structure in the period dimension with 52 level 0 members. However, this presents issues for users.

The lack of customization does not allow users to plan/forecast specific combinations of member dimensions (e.g., specific combinations of scenario, year, account, and the like) at different granularities and/or fails to allow proper comparison of different combinations of member dimensions that are planned at different granularities. For example, because the conventional approach lacks the functionality of the flexible period dimension (with weekly, monthly, quarterly, and/or yearly members) and valid combinations rules, both detailed in various embodiments, this approach cannot retrieve data for a cross-section of dimensions that includes different granularities for different dimension member combinations, filter the retrieved data based on the combinations predetermined to be "valid", and display this filtered data. In another example, each year the number of weeks per month vary, and thus, the conventional approaches, such as generating 0 to 52 members of the Period dimension, fail to enable proper year over year comparisons. Disclosed week to month conversions provide a technique for achieving the proper year to year comparison for data combinations planned/forecasted at different granularities.

Embodiments address the technical challenge of supporting mixed granularity for multidimensional models based on specifically customizable configurations, which can vary by customers, use case, and multiple dimensions in a multidimensional model. Embodiments dynamically generate valid combination rules. These rules drive the mixed granularity data management, making it efficient and feasible for users to define mixed granularity data in a multidimensional model. In addition, embodiments provide techniques that can easily scale for large dimensions/multiple dimensions based on the exclusion provided by the valid combination rules (which drive the mixed granularity functionality).

Embodiments incorporate weekly planning that solve challenges customer/users typically have in multidimensional models when planning at this granularity, as illustrated by the following use cases. A first use case for weekly planning is for sales and revenue planning, especially in industries such as retail, consumer goods ("FMCG"), and hotels and hospitality, where sales is tracked and planned on a weekly basis. Often weekly plans are derived from an overall monthly target planning. The sales planned on a weekly basis is then allocated by sales representatives and an organization will start to track performance against the plan. Eventually this can be considered for the monthly revenue plan for finance and overall management reporting. Weekly planning is relevant for various business models as well (e.g., subscription based sales, occupancy based sales, pure volume based sales).

A second use case considers the flexibility to plan marketing spending and associated revenue/uplift volumes from these marketing projects/campaigns. Identifying this correlation can be beneficial as a user or customer considers building marketing planning business processes or provides financials/project frameworks for these.

In a third use case, consider that, often, the treasury or cash function in a finance department performs a weekly plan of receipts and payments to understand the surplus or shortfall and manage working capital needs. This is an exercise to bring in all expected cash inflow and outflow for next week, and see how the shortfall is to be financed or excess is invested to optimize the overall cost of capital. This planning can sometimes be done using spreadsheet software, but it is time consuming.

In a fourth use case, information technology ("IT") services often track their consulting utilization and plan on a weekly basis. This can allow the overall project activity from a financial standpoint to be better understood.

In a fifth use case, sales and operations planning ("S&OP") processes are often done on a weekly cycle, where the weekly demand and supply plan for finished goods are matched to ascertain shortfall and necessary scenario adjustments to plan for the shortcomings. While the overall process can at times be monthly in S&OP, it would be beneficial to break it down to ascertain the weekly supply and demand, and to ascertain the capacity, resource, and other constraints per week. The weekly results could then be rolled up into monthly data for comparisons.

In a sixth use case, weekly level planning is often done for a subset of accounts, typically sales and margin or in an operational model the key drivers of the application. In financial models, weekly planning is often done for "variable" accounts where fixed costs are typically planned monthly. Thus, the granularity of planning for different accounts may vary by entity, as detailed herein.

The robust functionality provided by the described embodiments are beneficial in the above-noted use cases. In particular, the multi-dimensional data model and valid combinations filter presented by the disclosed embodiments provides granularity mixing that enable a number of functions that conventional approaches fail to provide.

A first function is the ability to define the month to week allocation and weekly to monthly aggregations. The described solution includes multiple options provided through configuration, and the weekly numbers can be aggregated to monthly numbers. In embodiments, there are 2 options, where in a planning context an organization can allocate monthly numbers to weeks, or can aggregate weekly numbers to months. In short, the granularity mapping can be done in one standard way.

A second function is the ability to configure a work week. Work week settings are relevant where hours and rate may need to be considered for compensation or other considerations. In addition, some work week settings may be used for reporting, analysis, and other uses. A third function is the ability to provide seasonality based analytics. For example, such an analytic can be useful for trend-based planning, such as a comparison between last year's season week to this year's, as the sales or occupancy can be different. A fourth function is week to date configurability. Like year to date and month to date, in operation planning context, week to date can be a calculation to consider as an organization may want to track plan data vs actual data at week to date.

Embodiments that provide these functions improve the ability of software to model, forecast, and otherwise predict organizational outcomes in a manner that provides decision makers relevant and useful data analytics. In particular, multi-dimensional data models that include sophisticated structures (such as hierarchical dimension members) can be cumbersome when software is asked to combine different elements of the data model. Some embodiments presented include granularities that are specific to certain combinations of data (e.g., a first granularity for entity 1 and account 1 and a second granularity for entity 1 and account 2), which further complicates the task of providing custom cross-sections of data.

The disclosed embodiments leverage configurable granularity to provide improved flexibility to represent organizational behavior while also maintaining an agile data model that allows different dimensions of data to be combined. The functionality of embodiments to provide user requested custom cubes of data without concern for incompatible granularities provides advantages over conventional approaches. For example, the combination of the disclosed data model and valid combination rules filter enable embodiments to better forecast, model, and predict organizational change, for example using scenario planning. The generated data structure that stores the valid combinations rules also provides a simplified approach to retrieving custom combinations of data that effectively manages the otherwise cumbersome tasks of combining highly configured data (e.g., entities that have different granularities depending on the requested cross-section of data).

Embodiments manage data elements of mixed granularity in a multidimensional data model. For example, a first data element can have a weekly granularity while a second data element has a monthly, quarterly, or yearly granularity. Selections can be received for cross-sections of data that involve, for example, the display various combinations of data elements. In some embodiments, the data model can include a plurality of dimensions of data, such as entity, accounts, products, scenario, year, period, and the like. An example selected cross-section of data can include a combination of a given scenario, entity, and account. However, some cases will include mismatched data granularities that will cause an invalid data combination when retrieving the selected cross-section of data from the data model (e.g., database). Embodiments provide technique for managing the mixed granularities. This management can include generating a plurality of rules for valid data combinations that can be used to filter the data retrieval. In some embodiments, conversion calculations are implemented so that data of varying granularities can still be displayed together. Some embodiments include a hierarchical multi-dimensional data model, where the plurality of rules for valid data combinations can include specific rules about parent nodes and child nodes. Thus, the valid combination rules can be used to manage mixed granularities among combinations of hierarchical data elements.

Embodiments of the conversion calculations include attributing weeks to months for a given quarter or year. For example, in some circumstances it may be appropriate to attribute a week to the month in which the first day of the week falls. In other circumstances, it may be appropriate to attribute a week to the month in which the majority of days in the week fall. Embodiments also describe reverse mapping techniques, that is mapping months to weeks, in order to perform relevant data analytics. Such mapping can be described as conversion calculations between granularities from among weekly, monthly, quarterly, or yearly periods.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for managing mixed data granularities for a multi-dimensional data model, the method comprising:
    receiving data granularities for data elements, wherein a first granularity is received for a first data element and a second granularity is received for a second data element, the first granularity comprising a first interval of time and the second granularity comprising a second interval of time, wherein the first granularity is different from the second granularity;
    receiving a selection of a cross-section of data spanning a plurality of dimensions in the multi-dimensional data model and an input that indicates a granularity for the selection, the selection including a first data combination based on the first data element and a second data combination based on the second data element;
    generating, based on the received selection of the cross-section of data, the received granularities, and a hierarchy for the multi-dimensional data model, a plurality of valid combinations rules;
    determining that a subset of data combinations based on the selection of the cross-section of data are invalid based on the valid combinations rules;
    performing combinations of data according to the selection including the first data combination and the second data combination, wherein the subset of data combinations is filtered from the performed combinations of data; and
    displaying, in a form, data according to the first granularity for the second data combination and data according to the first granularity for the first data combination.

2. The method of claim 1, further comprising:
    receiving one or more driver dimensions of the data model for the selection, the driver dimensions comprising the input that indicates the granularity for the selection, wherein the valid combinations rules are generated based on the selection of the cross-section of data, the received granularities, the hierarchy for the multi-dimensional data model, and the received driver dimensions, and the generated valid combinations rules comprise a data structure.

3. The method of claim 2, wherein the valid combinations rules comprise rules for evaluating a validity of combinations that includes a Period dimension of the multi-dimensional data model.

4. The method of claim 3, wherein filtering the subset of data combinations from the performed combinations comprises:
    retrieving data combinations indicated by the selection of the cross-section of data from a database;
    filtering the subset of data combinations from the retrieved data according to the valid combinations rules.

5. The method of claim 4, wherein the first data element comprises a first child data element of a parent data element, and combinations that include a second child data element of the parent data element comprise the second granularity.

6. The method of claim 5, wherein the valid combinations rules comprise rules for evaluating a validity of a combination between the second data element and the first data element and a combination between the second data element and the second child data element.

7. The method of claim 5, wherein the data structure of valid combinations rules comprises a paired rule that indicates the first data granularity as valid for combinations between a third data element and a first subset of child data elements of the parent data element and invalid for combinations between the third data element and a second subset of child data elements of the parent data element.

8. The method of claim 3, wherein the first data element comprises a combination of a first member of a first dimension and a second member of a second dimension.

9. The method of claim 8, wherein the first granularity comprises a monthly interval of time, the second granularity comprises a weekly interval of time, a monthly granularity is a default granularity for at least one of the first member and the second member, and the weekly granularity for the second data element is prioritized over the default granularity for combinations of the first member and the second member.

10. The method of claim 8, wherein the second dimension comprises the Period dimension for the multi-dimensional data model, the Period dimension comprising at least members that include weekly and monthly and the valid combinations rules for evaluating the validity of combinations defines one member of the Period dimension as valid for each combination managed by the rules.

11. The method of claim 10, wherein, for the second data element, the valid combinations rules define the weekly member of the Period dimension as valid and monthly member of the Period dimension as invalid.

12. A non-transitory computer-readable medium having instructions stored thereon that, when executed by a processor, cause the processor to:
receive data granularities for data elements, wherein a first granularity is received for a first data element and a second granularity is received for a second data element, the first granularity comprising a first interval of time and the second granularity comprising a second interval of time, wherein the first granularity is different from the second granularity;
receive a selection of a cross-section of data spanning a plurality of dimensions in a multi-dimensional data model and an input that indicates a granularity for the selection, the selection including a first data combination based on the first data element and a second data combination based on the second data element;
generate, based on the received selection of the cross-section of data, the received granularities, and a hierarchy for the multi-dimensional data model, a plurality of valid combinations rules;
determine that a subset of data combinations based on the selection of the cross-section of data are invalid based on the valid combinations rules;
perform combinations of data according to the selection including the first data combination and the second data combination, wherein the subset of data combinations is filtered from the performed combinations of data; and
display, in a form, data according to the first granularity for the second data combination and data according to the first granularity for the first data combination.

13. The computer-readable medium of claim 12, wherein the processor is further caused to:
receive one or more driver dimensions of the data model for the selection, the driver dimensions comprising the input that indicates the granularity for the selection, wherein the valid combinations rules are generated based on the selection of the cross-section of data, the received granularities, the hierarchy for the multi-dimensional data model, and the received driver dimensions, and the generated valid combinations rules comprise a data structure.

14. The computer-readable medium of claim 13, wherein the valid combinations rules comprise rules for evaluating a validity of combinations that includes a Period dimension of the multi-dimensional data model.

15. The computer-readable medium of claim 14, wherein filtering the subset of data combinations from the performed combinations comprises:
retrieving data combinations indicated by the selection of the cross-section of data from a database;
filtering the subset of data combinations from the retrieved data according to the valid combinations rules.

16. A system for managing mixed data granularities for a multi-dimensional data model, the system comprising:
a processor in communication with memory, wherein the processor when executing instructions is configured to:
receive data granularities for data elements, wherein a first granularity is received for a first data element and a second granularity is received for a second data element, the first granularity comprising a first interval of time and the second granularity comprising a second interval of time, wherein the first granularity is different from the second granularity;
receive a selection of a cross-section of data spanning a plurality of dimensions in the multi-dimensional data model and an input that indicates a granularity for the selection, the selection including a first data combination based on the first data element and a second data combination based on the second data element;
generate, based on the received selection of the cross-section of data, the received granularities, and a hierarchy for the multi-dimensional data model, a plurality of valid combinations rules;
determine that a subset of data combinations based on the selection of the cross-section of data are invalid based on the valid combinations rules;
perform combinations of data according to the selection including the first data combination and the second data combination, wherein the subset of data combinations is filtered from the performed combinations of data; and
cause a display, in a form, of data according to the first granularity for the second data combination and data according to the first granularity for the first data combination.

17. The method of claim 1, wherein the subset of data combinations comprises a combination involving at least one of the first data element and the second data element, and the one or more valid combinations rules indicate that the first data combination and the second data combination are valid.

18. The method of claim 1, further comprising:
mapping data of the second granularity for the second data element to the first granularity according to a predetermined conversion calculation.

19. The method of claim 1, wherein the generated plurality of valid combinations rules comprise at least two rules associated with a given data element, a first of the at least two rules defines a default granularity as valid for the given data element, and a second of the at least two rules defines a combination specific granularity as valid for the given data element, wherein the default granularity is different from the combination specific granularity.

20. The method of claim 19, wherein the second of the at least two rules defines the combination specific granularity as valid for combinations of the given data element with a specific data element from the multi-dimensional data model, and the validity of the combination specific granularity is prioritized over the default granularity for combinations of the given data element with the specific data element.

* * * * *

UNITED STATES PATENT AND TRADEMARK OFFICE
CERTIFICATE OF CORRECTION

PATENT NO. : 10,936,619 B2
APPLICATION NO. : 15/924726
DATED : March 2, 2021
INVENTOR(S) : Daga et al.

Page 1 of 1

It is certified that error appears in the above-identified patent and that said Letters Patent is hereby corrected as shown below:

In the Specification

In Column 4, Line 26, delete "("HFDS")," and insert -- ("HDFS"), --, therefor.

In Column 4, Line 46, delete ""Account'." and insert -- "Account". --, therefor.

In Column 7, Line 60, delete "weeks" and insert -- weeks. --, therefor.

In Columns 9-10, Line 48, delete "Explaination" and insert -- Explanation --, therefor.

In Columns 15-16, Line 38, delete "[mbrName:" and insert -- {mbrName: --, therefor.

In Columns 17-18, Line 25, delete "]{mbrName:" and insert -- [{mbrName: --, therefor.

In Columns 17-18, Line 31, delete "":true] ," and insert -- ":true}, --, therefor.

In Columns 17-18, Line 32, delete ""：true]," and insert -- ":true}, --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*